(12) United States Patent
Kawamura et al.

(10) Patent No.: US 9,505,371 B2
(45) Date of Patent: Nov. 29, 2016

(54) HEAD-PROTECTING AIRBAG DEVICE

(71) Applicant: TOYODA GOSEI CO., LTD., Kiyosu-shi, Aichi-ken (JP)

(72) Inventors: Koji Kawamura, Kiyosu (JP); Yuji Sato, Kiyosu (JP); Masaaki Okuhara, Kiyosu (JP); Takashi Iida, Kiyosu (JP); Masashi Hotta, Kiyosu (JP); Takuya Hiraiwa, Kiyosu (JP); Yasushi Okada, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 14/863,740

(22) Filed: Sep. 24, 2015

(65) Prior Publication Data
US 2016/0114754 A1 Apr. 28, 2016

(30) Foreign Application Priority Data

Oct. 23, 2014 (JP) .................................. 2014-216302
Aug. 7, 2015 (JP) .................................. 2015-157541

(51) Int. Cl.
*B60R 21/232* (2011.01)
*B60R 21/2334* (2011.01)
*B60R 21/214* (2011.01)
(Continued)

(52) U.S. Cl.
CPC ......... *B60R 21/2334* (2013.01); *B60R 21/214* (2013.01); *B60R 21/232* (2013.01); *B60R 21/237* (2013.01); *B60R 21/23138* (2013.01); *B60R 2021/23192* (2013.01)

(58) Field of Classification Search
CPC ............ B60R 21/2334; B60R 21/214; B60R 21/23138; B60R 21/232; B60R 21/237; B60R 2021/23192

USPC ...................................................... 280/730.2
See application file for complete search history.

(56) References Cited

U.S. PATENT DOCUMENTS

| | | | |
|---|---|---|---|
| 7,168,735 B2* | 1/2007 | Kino ..................... | B60R 21/213 280/730.2 |
| 7,571,930 B2* | 8/2009 | Osterhout ........... | B60R 21/2338 280/730.2 |
| 7,658,401 B2* | 2/2010 | Valdez .................. | B60R 21/232 280/730.2 |

(Continued)

FOREIGN PATENT DOCUMENTS

JP    2012-020719 A    2/2012

OTHER PUBLICATIONS

Translation of JP2012020719 filed Sep. 24, 2015.*

*Primary Examiner* — Faye M Fleming
(74) *Attorney, Agent, or Firm* — Posz Law Group, PLC

(57) ABSTRACT

An airbag of a head-protecting airbag device includes a bag body, a plurality of mounting tabs for mounting an upper edge of the bag body on the vehicle body, and a tension cloth. The bag body includes at its terminal region in a front and rear direction where the tension cloth is located a terminal inflatable portion that is partitioned from a remaining general inflatable portion by a terminal partitioning portion. The terminal inflatable portion is so deployable that its upper end region be deployed on an inboard side of a pillar. The mounting tabs include a terminal mounting tab located at the terminal region where the terminal inflatable portion is located and a general mounting tab located at the general inflatable portion. An upward protruding amount of the terminal mounting tab out of the bag body in an unfolded state is greater than that of the general mounting tab.

10 Claims, 17 Drawing Sheets

(51) Int. Cl.
  *B60R 21/231* (2011.01)
  *B60R 21/237* (2006.01)

(56) References Cited

U.S. PATENT DOCUMENTS

| | | | | |
|---|---|---|---|---|
| 8,240,707 B2* | 8/2012 | Valdez | ................. | B60R 21/232 280/730.2 |
| 9,114,777 B2* | 8/2015 | Fukawatase | .......... | B60R 21/232 |
| 2004/0183286 A1* | 9/2004 | Kino | .................... | B60R 21/232 280/730.2 |
| 2005/0062268 A1* | 3/2005 | Inoue | ................... | B60R 21/2342 280/730.2 |
| 2007/0046009 A1* | 3/2007 | Miura | ................... | B60R 21/233 280/743.2 |
| 2010/0225097 A1* | 9/2010 | Trovato | ................ | B60R 21/232 280/730.2 |
| 2014/0265268 A1* | 9/2014 | Wang | .................... | B60R 21/232 280/729 |
| 2014/0265270 A1* | 9/2014 | Wang | .................... | B60R 21/237 280/730.2 |
| 2015/0314746 A1* | 11/2015 | Okuhara | ................. | B60R 21/20 280/728.2 |

* cited by examiner

HEAD-PROTECTING AIRBAG DEVICE

CROSS REFERENCE TO RELATED APPLICATIONS

The Present application claims priority from Japanese Patent Application No. 2014-216302 of Kawamura et al., filed on Oct. 23, 2014 and Japanese Patent Application No. 2015-157541 of Kawamura et al., filed on Aug. 7, 2015, the disclosures of which are hereby incorporated into the present application by reference.

BACKGROUND OF THE INVENTION

1. Field of the Invention

The present invention relates to a head-protecting airbag device whose airbag is mountable on an upper periphery of a window of a vehicle at an inboard side of the vehicle in a folded-up configuration with an upper edge thereof secured to a vehicle body structure and is deployable downward over the window when fed with an inflation gas.

2. Description of Related Art

JP2012-20719 (especially FIGS. 9 to 11) discloses a known head-protecting airbag device that includes an airbag body for covering an inboard side of a window, a terminal partitioning portion extending generally in an up and down direction and a terminal inflatable portion that is partitioned from a remaining general inflatable portion of the airbag body by the terminal partitioning portion. The airbag further includes a tension cloth that is disposed on an outboard side of the terminal inflatable portion. A first end of the tension cloth is connected to the terminal partitioning portion and a second end of the tension cloth is fixed to a vehicle body structure at a periphery of the window. This conventional head-protecting airbag device is so designed that the airbag body covers the inboard side of the window in order to protect a head of an occupant which would otherwise be thrown out of the vehicle in the event of a rollover of the vehicle. The tension cloth is a generally right triangle in outer contour and its first end or rear edge is connected to the terminal partitioning portion generally entirely in an up and down direction, while its second end or front edge is secured to the vehicle body structure.

At airbag deployment of the conventional head-protecting airbag device, a tension is exerted generally along a front and rear direction between the leading end or front end of the tension cloth to the rear end of the airbag body, such that the terminal inflatable portion is pushed toward an interior of the vehicle by the tension cloth in such a manner as to direct the front end toward the vehicle interior, and consequently the terminal inflatable portion is deployed farther inward than the general inflatable region. Further, in the conventional head-protecting airbag device, the terminal inflatable portion is connected with the tension cloth only by the rear end (i.e., at the terminal partitioning portion), and is mounted on the vehicle body at the upper periphery of the window by a position at the rear of and above the terminal partitioning portion.

The airbag body of the conventional head-protecting airbag device further includes more than one mounting portions that mount the airbag body on the vehicle body structure. Out of the mounting portions, a mounting portion that mounts an upper edge of a vicinity of the terminal inflatable portion has generally the same protruding amount out of the airbag body as other mounting portions that mount an upper edge of a remaining region of the airbag body on the vehicle body structure. With this configuration, the mounting portion located proximate the terminal inflatable portion may keep the terminal inflatable portion from deploying towards a vehicle interior sufficiently though it is expected to cover an inboard side of the pillar garnish of the front pillar protruding further inward than the window. In such an instance, the terminal inflatable portion may fail to cover the inboard side of the pillar garnish sufficiently.

SUMMARY OF THE INVENTION

It is an object of the present invention to provide a head-protecting airbag device that is capable of deploying an upper end region of the terminal inflatable portion of an airbag on an inboard side of a pillar smoothly when the airbag includes the terminal inflatable portion and a tension cloth which supports an outboard side of the upper end region of the terminal inflatable portion at airbag deployment.

The head-protecting airbag device of the invention includes an airbag that is mountable on an upper periphery of a window of a vehicle on an inboard side of the vehicle in a folded-up configuration with an upper edge of the airbag secured to a vehicle body structure. The airbag is deployable downward over the window when fed with an inflation gas from an inflator. The airbag includes:

an inflatable bag body that is formed into a flexible bag for covering an inboard side of the window, the bag body including: a terminal inflatable portion located at a terminal region in a front and rear direction of the bag body and so deployable that an upper end region of the terminal inflatable portion be deployed on an inboard side of a pillar of the vehicle disposed at an edge in a front and rear direction of the window in a slanted fashion relative to an up and down direction; and a terminal partitioning portion that partitions the terminal inflatable portion from a remaining general inflatable portion of the bag body;

a tension cloth that is formed of a flexible sheet member and is so disposed as to cover an outboard side of the terminal inflatable portion, a first end of the tension cloth being connected to the terminal partitioning portion and a second end of the tension cloth being adapted to be secured to the vehicle body structure in a periphery of the window distant from the terminal region of the bag body; and a plurality of mounting tabs that are disposed at a plurality of positions along a front and rear direction of an upper edge of the bag body in such a manner as to protrude upward out of the upper edge of the bag body for mounting the upper edge of the bag body on the vehicle body structure, the mounting tabs including a terminal mounting tab located at the terminal region in a front and rear direction of the bag body where the terminal inflatable portion is located and a general mounting tab located at an upper edge of the general inflatable portion, wherein the terminal mounting tab is adapted to be mounted on the vehicle body structure by an upper end thereof and an upward protruding amount of the terminal mounting tab out of the bag body as unfolded in a flat fashion is greater than that of the general mounting tab.

In the head-protecting airbag device of the invention, the terminal mounting tab disposed at the terminal region in a front and rear direction of the airbag where the terminal inflatable portion is located is adapted to be mounted on the vehicle body structure by the upper end of the terminal mounting tab, and the upward protruding amount of the terminal mounting tab out of the bag body as unfolded in a flat fashion is greater than that of the general mounting tab for mounting the upper edge of the general inflatable portion on the upper periphery of the window. That is, since the terminal mounting tab, which mounts the upper end of the terminal region in a front and rear direction where the terminal inflatable portion is located on the vehicle body structure, has a greater length than the general mounting tab, the terminal mounting tab will not hinder such a deployment behavior of the terminal inflatable portion that is pushed inward by the tension cloth in such a manner as to direct its edge in a front and rear direction toward a vehicle interior. Accordingly, the terminal inflatable portion will be deployed toward the vehicle interior smoothly generally entirely in an up and down direction. Moreover, since the terminal mounting tab will be deployed at airbag deployment in such a manner as to pass under lower edges of a pillar garnish of the pillar and roof head liner and extend upward, the terminal mounting tab will allow the upper end region of the terminal inflatable portion to be smoothly deployed on the inboard side of the pillar and cover the inboard side of the pillar extensively although the pillar garnish protrudes farther towards the vehicle interior than the window.

Therefore, the head-protecting airbag device of the invention will be capable of deploying the upper end region of the terminal inflatable portion of the airbag on the inboard side of the pillar smoothly even if the airbag includes the terminal inflatable portion and the tension cloth which supports the outboard side of the upper end region of the terminal inflatable portion at airbag deployment.

Further, in the head-protecting airbag device of the invention, although the terminal mounting tab may be mounted on the vehicle body structure at a pillar, at a border between the pillar and the roof side rail extending along the upper periphery of the window or the like, the great length of the terminal mounting tab will allow the upper end region of the terminal inflatable portion supported by the tension cloth to pass under the pillar garnish protruding toward a vehicle interior at the pillar and cover the inboard side of the pillar smoothly. In the event of an oblique crash, the terminal inflatable portion thus supported by the pillar will protect a head of an occupant moving obliquely forward and towards an outboard direction adequately.

Moreover, since the terminal inflatable portion is designed to be deployed in an area of the pillar disposed in an edge in a front and rear direction of the window and the terminal inflatable portion and the general inflatable portion cover the inboard side of the window extensively, the terminal inflatable portion and general inflatable portion will arrest and protect a head of an occupant which would otherwise be thrown out of the vehicle in the event of a rollover.

In the head-protecting airbag device of the invention, if the terminal mounting tab is located at a position further toward the terminal region in a front and rear direction of the bag body than an edge of the terminal partitioning portion facing towards the general inflatable portion, the upper end of the terminal inflatable portion is fixed to the vehicle body structure by the terminal mounting tab. This configuration will prevent an entire area in an up and down direction of the terminal inflatable portion from being pushed inward by the tension cloth more than necessary at airbag deployment, and further prevent the terminal inflatable portion from contacting an airbag for a front passenger seat, an airbag for a steering wheel, a side airbag or the like deployed in proximity in the vehicle interior, thus completing deployment of the terminal inflatable portion quickly. Moreover, since the terminal mounting tab fixes the upper end of the terminal inflatable portion to the vehicle body structure, it will prevent the terminal inflatable portion moving further downward than the general inflatable portion at airbag deployment and thus enable the terminal inflatable portion to cover the upper periphery of the window immediately below the pillar in an adequate fashion and to protect an occupant's head moving toward an outboard direction in a further adequate fashion in the event of a rollover of the vehicle.

If, in the head-protecting airbag device configured as described above, the terminal mounting tab is formed in such a manner as to extend from the tension cloth and a root region of the terminal mounting tab is connected to the upper edge of the terminal inflatable portion, the tension cloth will be able to cover the outboard side of the terminal inflatable portion to the upper end with the aid of the terminal mounting tab, thus will able to push an extensive area in an up and down direction of the terminal inflatable portion toward the vehicle interior and help deploy the terminal inflatable portion in the vehicle interior smoothly at airbag deployment.

If, furthermore, the terminal mounting tab is located at a position further toward the terminal region in a front and rear direction of the bag body than the terminal partitioning portion, the upper end region of the terminal inflatable portion will be prevented from protruding toward the vehicle interior more than necessary and will be fixed to the vehicle body structure in a steady fashion.

In the head-protecting airbag device configured as described above, the terminal mounting tab may also be located generally immediately above a joint that connects the tension cloth to the terminal partitioning portion and further toward the terminal region in a front and rear direction of the bag body than the edge of the terminal partitioning portion facing towards the general inflatable portion. This configuration locates the terminal mounting tab further to the terminal region in a front and rear direction than the edge of the terminal partitioning portion around which the terminal inflatable portion bends relative to the general inflatable portion at airbag deployment. Accordingly, an undue protrusion of the upper end region of the terminal inflatable portion will be prevented.

Moreover, in the head-protecting airbag device configured as described above, the terminal mounting tab may also be provided separate from the tension cloth and located further toward the terminal region in a front and rear direction of the bag body than the terminal partitioning portion. This configuration will help save a base material and contribute to size and weight saving of the device, and will help prevent the upper end region of the terminal inflatable portion from protruding toward the vehicle interior more than necessary and fix the upper end region of the terminal inflatable portion to the vehicle body structure in a steady fashion.

Alternatively, the terminal mounting tab may be provided separate from the tension cloth and located generally immediately above a joint that connects the tension cloth to the terminal partitioning portion and further toward the terminal region in a front and rear direction of the bag body than the edge of the terminal partitioning portion facing towards the general inflatable portion. This configuration will also help save a base material and contribute to size and weight saving of the device, and since the terminal mounting tab is located further to the terminal region in a front and rear direction than the edge of the terminal partitioning portion around which the terminal inflatable portion bends relative to the general inflatable portion at airbag deployment, an undue protrusion of the upper end region of the terminal inflatable portion will be prevented.

Furthermore, in the head-protecting airbag device configured as described above, the tension cloth may be run through a slit that is formed in an edge in a front and rear direction of the terminal inflatable portion of the bag body. This configuration will help fix the location of the tension cloth against the bag body with the aid of a periphery of the slit, and facilitate folding of the bag body integrally with the tension cloth, thus improving the work efficiency at folding of the bag body.

Furthermore, in the head-protecting airbag device configured as described above, it is desired that the terminal mounting tab is located further towards a center in a front and rear direction of the bag body than the terminal partitioning portion, in particular, so as to be mounted by the upper end thereof on an area of the roof side rail of a vehicle continuous with the pillar and extending along the upper periphery of the window.

Such a configuration will enable the airbag to be folded up from a flattened state, before mounted on a vehicle, through such a folding process that the terminal inflatable portion is firstly folded back toward the general inflatable portion on a vicinity of the terminal partitioning portion and then the bag body is folded up in such a manner that the lower end region is brought close to the upper end region. This way the bag body including the terminal inflatable portion in a folded state can be mounted only on the roof side rail located away from the pillar. In other words, only the tension cloth is mounted on the pillar extending at a slant, thus the airbag will be mounted on a vehicle smoothly even if the pillar has a limited inner space.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
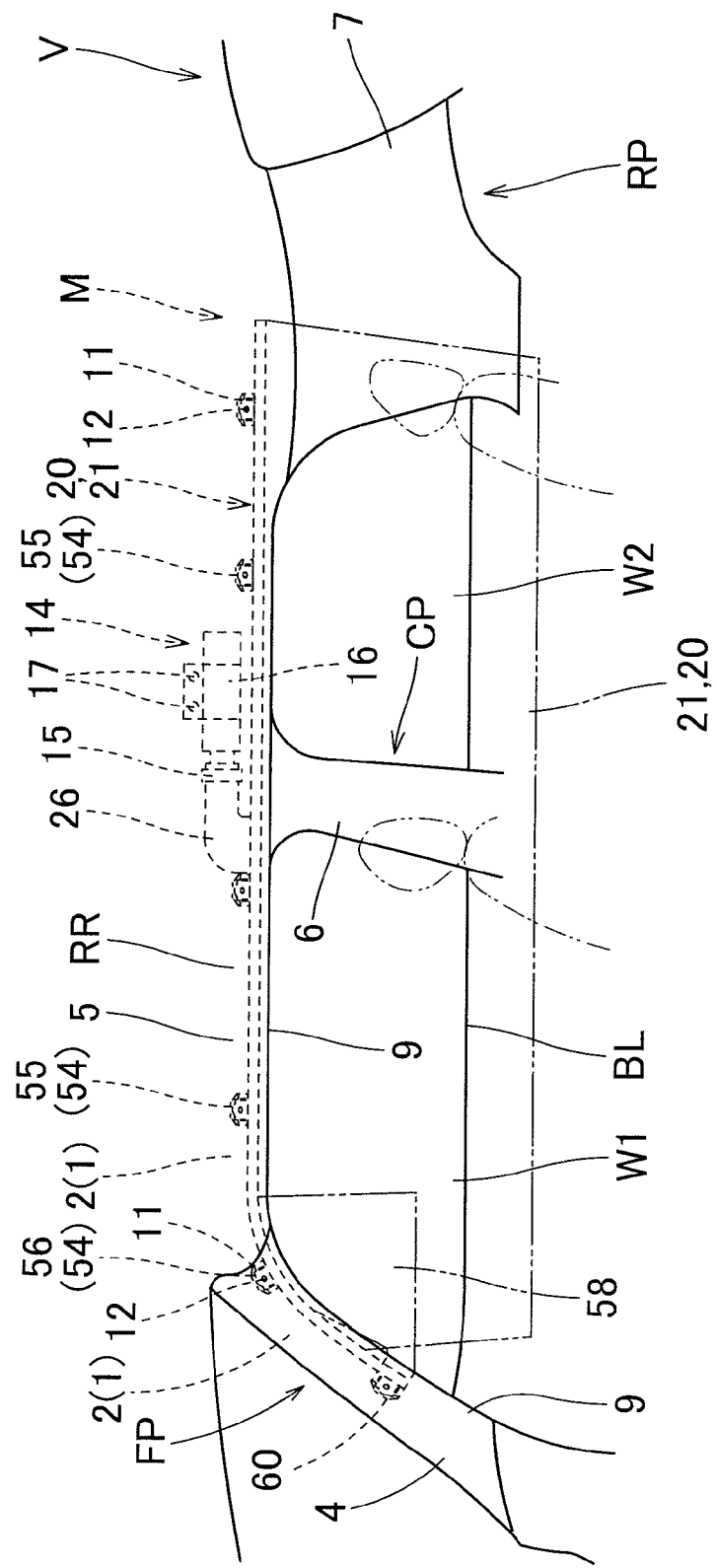
FIG. 1 is a schematic front view of a head-protecting airbag device embodying the invention as viewed from a vehicle interior.

As shown in FIG. 1, a head-protecting airbag device M embodying the present invention is mounted on a vehicle V with two side windows W1 and W2, i.e., with two rows of seats. The head-protecting airbag device M includes an airbag 20, an inflator 14, mounting brackets 11, a mounting bracket 16, and an airbag cover 9. The airbag 20 is housed at upper peripheries of the windows W1 and W2 on an inboard side of the vehicle V in a folded-up configuration, specifically from a lower periphery of a front pillar FP to a region above a rear pillar RP, via a lower periphery of a roof side rail RR.

Figure 8:
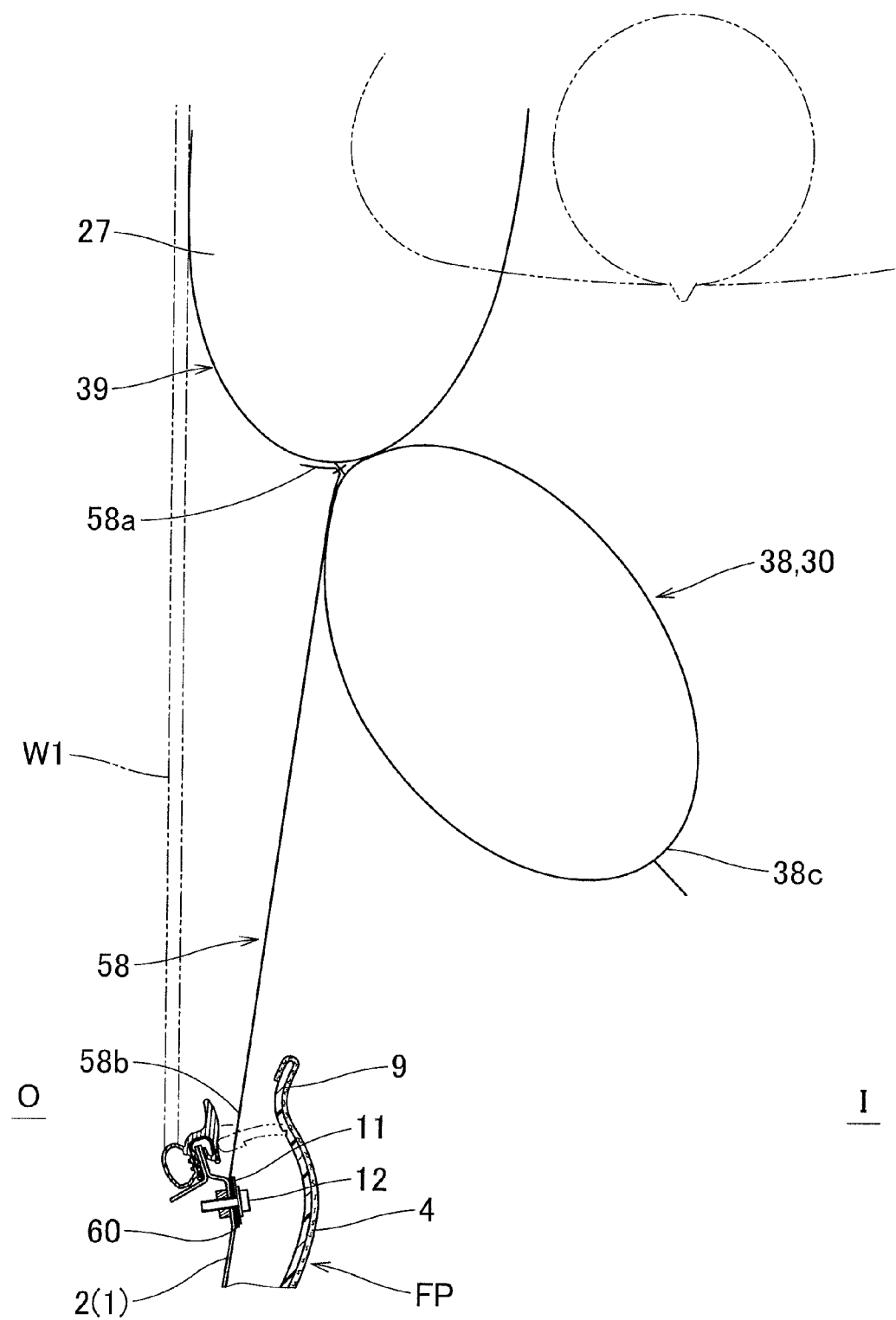
FIG. 8 is a schematic partial enlarged horizontal section taken along a front and rear direction of the airbag device at airbag deployment.
Figure 9:
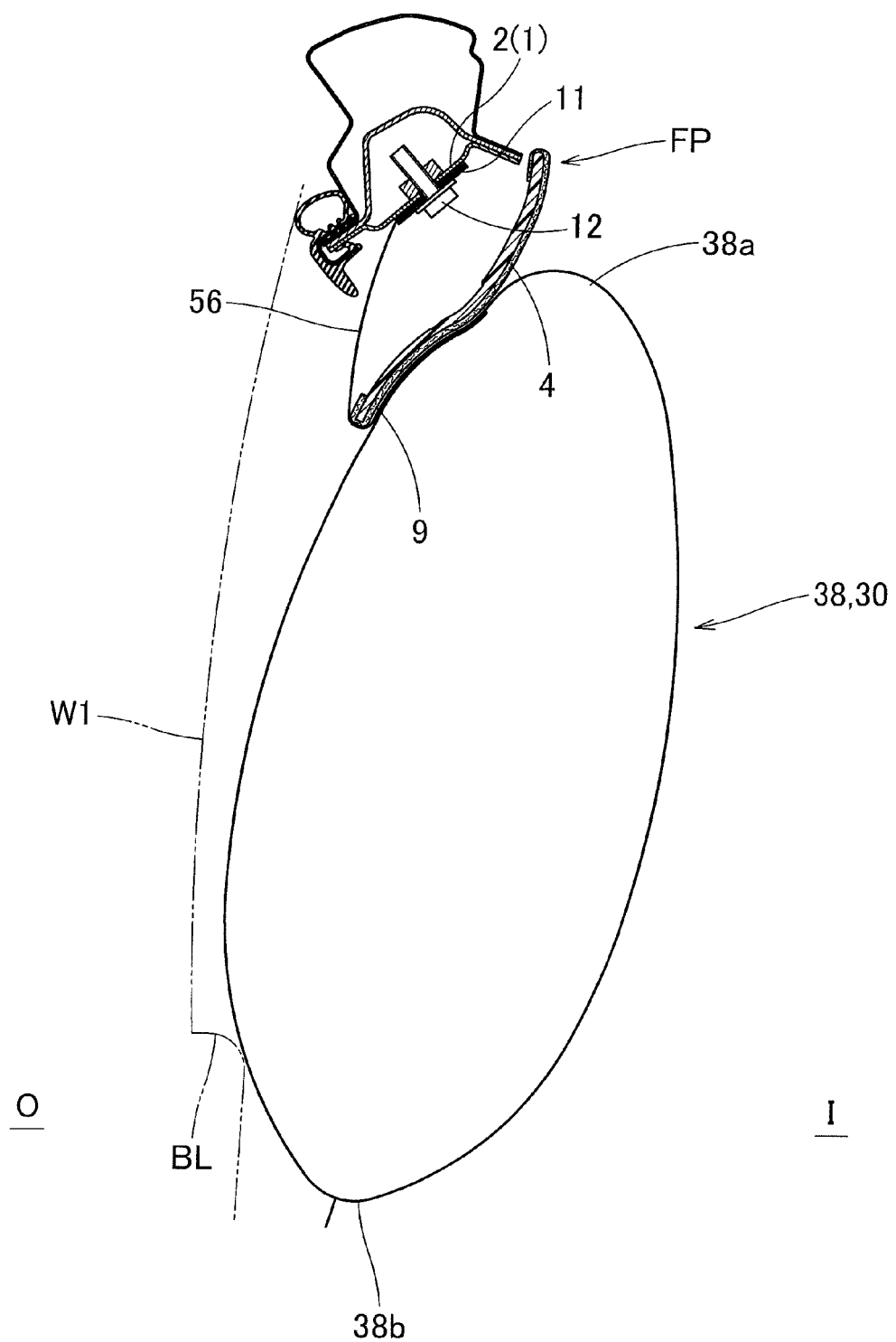
FIG. 9 is a schematic partial enlarged vertical section taken along an up and down direction of the airbag device at airbag deployment.

As shown in FIGS. 1, 8 and 9, the airbag cover 9 is constructed of a lower hem of a front pillar garnish 4 arranged on the front pillar FP and a lower hem of a roof head liner 5 arranged on the roof side rail RR. The front pillar garnish 4 and roof head liner 5 are fabricated of synthetic resin and secured to an inner panel 2 of the vehicle body structure 1 at the front pillar FP and roof side rail RR on the inboard side of the vehicle V. The airbag cover 9 covers an inboard side of the airbag 20 and is openable toward an interior of the vehicle when pushed by the airbag 20 under inflation for allowing airbag deployment (FIGS. 8 and 9).

As shown in FIG. 1, the inflator 14 is substantially columnar in shape and includes at the leading end gas discharge ports (not shown) for feeding an inflation gas into the airbag 20. The leading end of the inflator 14 provided with the gas discharge ports is inserted into a later-described connection port 26 of the airbag 20, and a clamp 15 is mounted around the connection port 26, thus the inflator 14 is coupled to the airbag 20. The inflator 14 is secured to the inner panel 2 above the window W2 by a mounting bracket 16 mounted around the inflator 14 and mounting bolts 17 for fixing the mounting bracket 16 to the inner panel 2 (FIG. 1). The inflator 14 is electrically connected with a not-shown control of the vehicle V via a not-shown lead wire, and is so designed as to be actuated in response to an actuating signal fed from the control that has detected a side impact, an oblique crash or a rollover of the vehicle V.

Mounting brackets 11 are used to mount the airbag 20 on the inner panel 2. Each of the mounting brackets 11 is composed of a pair of plates of metal, which are applied to inboard and outboard sides of each of later-described mounting tabs 54 (general mounting tabs 55 and a terminal mounting tab 56) and a mounting portion 60 of the airbag 20. Mounting bolts 12 secure the mounting brackets 11, together with the mounting tabs 54 and the mounting portion 60, to the inner panel 2 as shown in FIGS. 8 and 9.

As shown in FIGS. 2 to 6, the airbag 20 includes a bag body 21, mounting tabs 54 that mount an upper edge 21a of the bag body 21 to the inner panel 2 of the vehicle body structure 1 and a tension cloth 58 that extends from either front end or rear end region of the bag body 21 to be fixed to the inner panel 2 by the leading end 58b. In the illustrated embodiment, the tension cloth 58 extends from the front end 21c region of the bag body 21.

Figure 2:
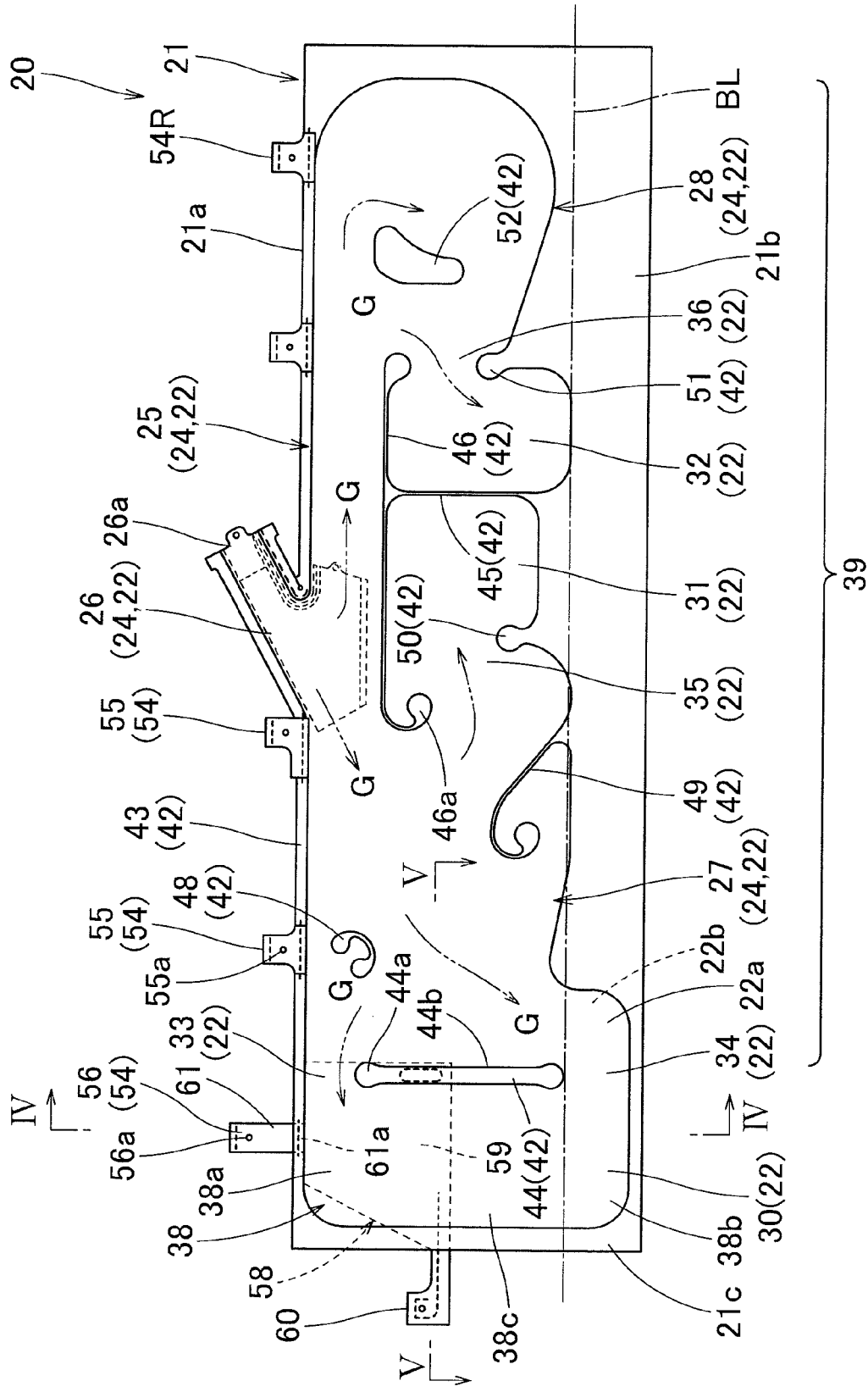
FIG. 2 is a front view of an airbag for use in the airbag device of FIG. 1 in a flattened state.
Figure 6:
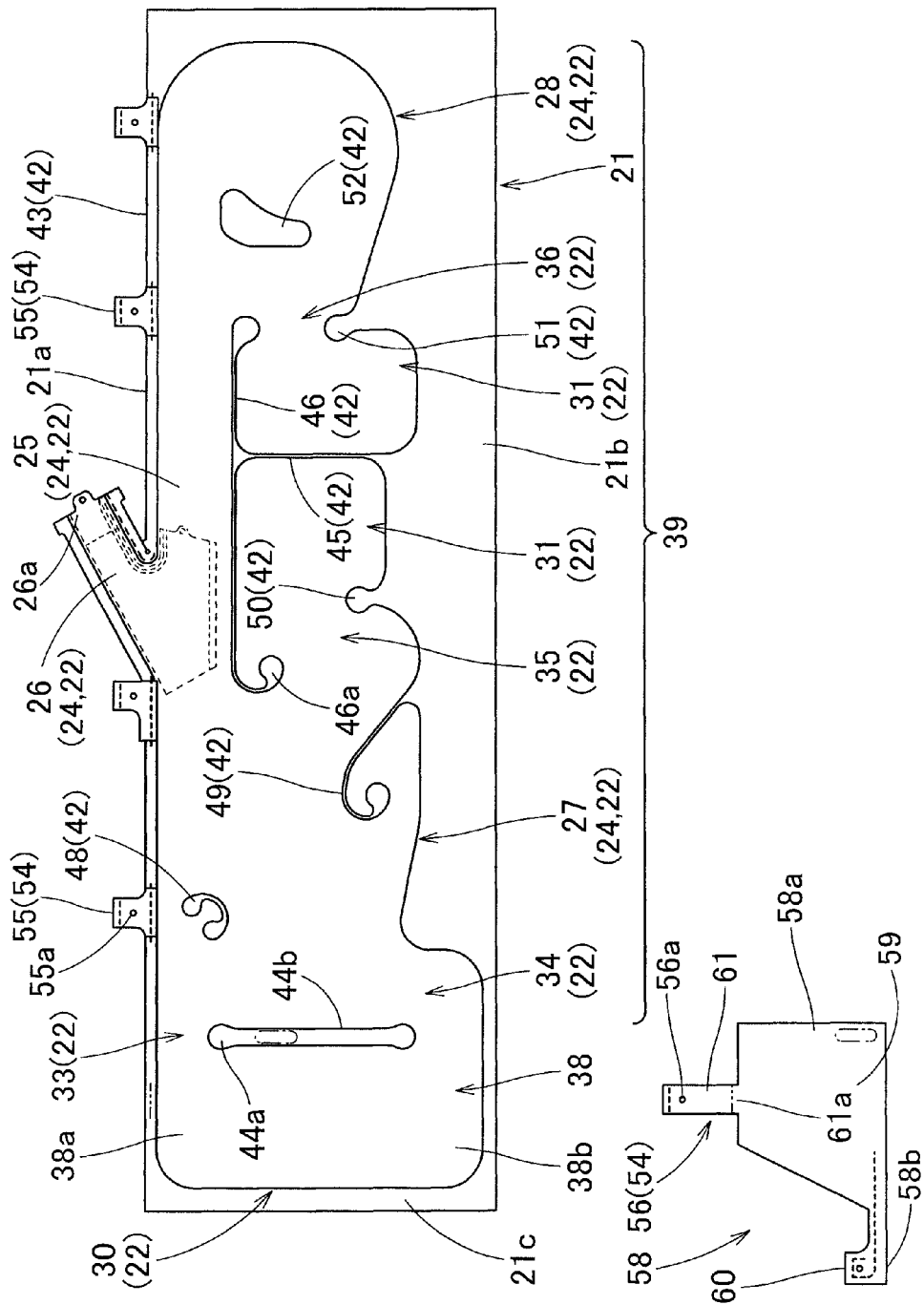
FIG. 6 depicts an airbag body with mounting tabs and the tension cloth set out side by side by front views.
Figure 7:
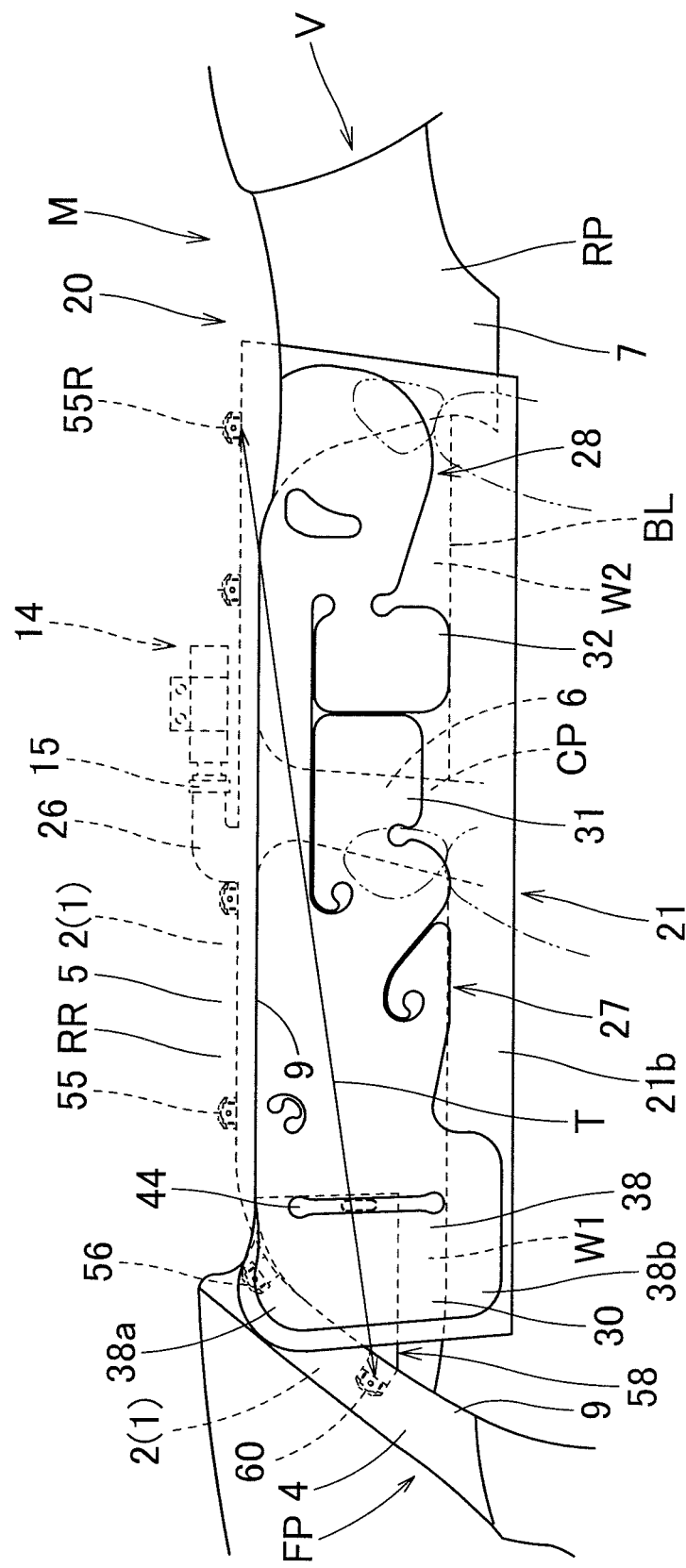
FIG. 7 is a schematic front view of the head-protecting airbag device at airbag deployment as viewed from a vehicle interior.

As shown in FIGS. 1 (by double-dotted lines) and 7, the bag body 21 is designed to inflate and unfold from a folded-up configuration when fed with an inflation gas from the inflator 14 so as to cover inboard sides of the windows W1, W2 and pillar garnishes 6 and 7 of the center pillar CP and rear pillar RP. The bag body 21 is formed into such a generally rectangular plate extending generally along a front and rear direction as to cover a region ranging from the window W1 to a front area of the rear pillar RP via the center pillar CP and window W2 (FIGS. 2 and 6). As shown in FIGS. 2 and 7, the bag body 21 has such a width in an up and down direction that the lower edge 21b of the bag body 21 is deployable below a beltline BL of the vehicle constituted by lower edges of the windows W1 and W2.

The bag body 21 of the embodiment is made by hollow-weaving method using polyamide yarns, polyester yarns or the like. As shown in FIGS. 2 and 4 to 6, the bag body 21 includes a gas admissive portion 22 which admits an inflation gas and inflates and a non-admissive portion 42 which admits no inflation gas. When an inflation gas is introduced, the gas admissive portion 22 inflates in such a manner that an inboard side wall 22a, which is deployable toward a vehicle interior I, and an outboard side wall 22b, which is deployable toward a vehicle exterior O, are separated from each other.

The gas admissive portion 22 includes a main inflatable portion (primary inflatable portion) 24 inflatable with an inflation gas fed from the inflator 14, secondary inflatable portions which are in gas communication with the main inflatable portion 24 and complete inflation after the main inflatable portion 24 has completed inflation, and communication portions 33, 34, 35, and 36 which provide gas communication between the main inflatable portion 24 and secondary inflatable portions. The secondary inflatable portions include a front sub inflatable portion 30, a central sub inflatable portion 31 and a rear sub inflatable portion 32. In the illustrated embodiment, the bag body 21 is designed to admit inflation gas and inflate generally entirely except at small regions of later-described terminal partitioning portion 44, general partitioning portions 45 and 46 and thickness regulating portions 48, 49, 50, 51 and 52 which partition the main inflatable portion 24, front sub inflatable portion 30, central sub inflatable portion 31 and rear sub inflatable portion 32 as shown in FIGS. 2 and 6.

The main inflatable portion 24 includes a gas feed path 25, a connection port 26, a front seat protection portion 27 and a rear seat protection portion 28.

The gas feed path 25 extends in a front and rear direction along the upper edge 21a of the bag body 21 and is arranged over an entire area in a front and rear direction of the main inflatable portion 24. The gas feed path 25 serves to guide an inflation gas G discharged from the inflator 14 into the front seat protection portion 27 and rear seat protection portion 28 located below the gas feed path 25. In the illustrated embodiment, at a position slightly forward relative to the center in a front and rear direction of the gas feed path 25 (in other words, generally at the center in a front and rear direction of the bag body 21) is the connection port 26 connected with the inflator 14. The connection port 26 is in gas communication with the gas feed path 25 and projects upward from the gas feed path 25 in a rearward and upwardly slanted fashion. The connection port 26 is open at the rear end 26a for receiving the inflator 14. The inflator 14 is inserted therein and fastened with the clamp 15, thus the connection port 26 and the inflator 14 are connected. In the illustrated embodiment, a separate inner tube (reference numeral omitted) is disposed in an area ranging from the connection port 26 to a region of the gas feed path 25 immediately below the connection port 26 for enhancing heat resistance (FIGS. 2 and 6).

The front seat protection portion 27 is deployable at a side of the front seat for protecting a head of an occupant seated in the front seat in the event of a side impact. The rear seat protection portion 28 is deployable at a side of the rear seat for protecting a head of an occupant seated in the rear seat in the event of a side impact.

The front sub inflatable portion 30 adjoins the main inflatable portion 24 in front of the main inflatable portion 24 (in front of the front seat protection portion 27) and is located at the front end 21c of the bag body 21. In the bag body 21 of the illustrated embodiment, the front sub inflatable portion 30 located at the front end 21c constitutes a terminal inflatable portion 38. The front sub inflatable portion 30 is inflatable into a generally rod extending in an up and down direction and is partitioned from the front seat protection portion 27 by the terminal partitioning portion 44. The front sub inflatable portion 30 is so deployable as to extend farther downward relative to the beltline BL and such that its lower end 38b is located on the lower side of the front seat protection portion 27. The front sub inflatable portion 30 is in gas communication with the front seat protection portion 27 via the communication portion 33 located at the rear upper end and the communication portion 34 located at the rear lower end. Each of the communication portions 33 and 34 has a small opening width so as to delay a start of inflow of an inflation gas into the front sub inflatable portion 30 relative to the front seat protection portion 27.

The central sub inflatable portion 31 adjoins the front seat protection portion 27 of the main inflatable portion 24 at the rear of the front seat protection portion 27 and is located below the gas feed path 25. The central sub inflatable portion 31 is in gas communication with the front seat protection portion 27 via the communication portion 35 disposed at the rear of the front seat protection portion 27. The communication portion 35 also has a small opening width so as to delay a start of inflow of an inflation gas into the central sub inflatable portion 31 relative to the front seat protection portion 27. The rear sub inflatable portion 32 adjoins the rear seat protection portion 28 of the main inflatable portion 24 and is so disposed as to fill up an area between the central sub inflatable portion 31 and the rear seat protection portion 28, below the gas feed path 25. The rear sub inflatable portion 32 is in gas communication with the rear seat protection portion 28 via the communication portion 36 located at the front end of the rear seat protection portion 28. The communication portion 36 also has a small opening width so as to delay a start of inflow of an inflation gas into the rear sub inflatable portion 32 relative to the rear seat protection portion 28.

In the illustrated embodiment, the front sub inflatable portion 30 constitutes the terminal inflatable portion 38 located at the front end 21c region of the bag body 21, and a region of the gas admissive portion 22 except the terminal inflatable portion 38 forms a general inflatable portion 39. The terminal inflatable portion 38 is partitioned from the front seat protection portion 27 (i.e., from the general inflatable portion 39) by the terminal partitioning portion 44. More specifically, the terminal partitioning portion 44 of the illustrated embodiment is formed into a rod isolated from a later-described peripheral portion 43 and generally extending along an up and down direction, and the terminal inflatable portion 38 is in gas communication with the front seat protection portion 27 by the upper end 38a and lower end 38b via the communication portions 33 and 34. The terminal inflatable portion 38 is so designed that the upper end 38a region is deployed, at airbag deployment, at an inboard side of the front pillar FP which extends in a rearwardly and upwardly slanted fashion relative to an up and down direction at the front periphery of the window W1. In particular, the upper end 38a region of the terminal inflatable portion 38 covers an inboard side of a rear end region of the front pillar garnish 4 covering the front pillar FP at airbag deployment, as shown in FIGS. 7 and 9. Further, the terminal inflatable portion 38 is so designed as to extend the lower end 38b region farther downward than the beltline BL at airbag deployment.

The non-admissive portion 42 includes a peripheral portion 43 defining an outer periphery of the gas admissive portion 22, a terminal partitioning portion 44, general partitioning portions 45 and 46 and thickness regulating portions 48, 49, 50, 51 and 52 disposed within an area of the gas admissive portion 22.

The peripheral portion 43 is so arranged as to enclose the gas admissive portion 22 except the rear end 26a of the connection port 26.

The terminal partitioning portion 44 partitions the front sub inflatable portion 30 from the front seat protection portion 27 (i.e., partitions the terminal inflatable portion 38 from the general inflatable portion 39) and is formed into a generally rod generally extending along an up and down direction. The terminal partitioning portion 44 is isolated from the peripheral portion 43. The upper end 44a of the terminal partitioning portion 44 is located above a later-described general partitioning portion 46.

The general partitioning portions 45 and 46 are located in an area of the general inflatable portion 39 and divide the general inflatable portion 39 into the gas feed path 25, front seat protection portion 27, rear seat protection portion 28, central sub inflatable portion 31 and rear sub inflatable portion 32. The general partitioning portion 45 is formed into a generally rod extending upward from a lower edge region of the peripheral portion 43 and partitions the central sub inflatable portion 31 from the rear sub inflatable portion 32. The general partitioning portion 46 extends forward and rearward from the upper end of the general partitioning portion 45 and forms the lower edge of the gas feed path 25 while partitioning the central sub inflatable portion 31 and the rear sub inflatable portion 32 from the gas feed path 25. The general partitioning portion 46 includes at the front end a curving partitioning portion 46a which bends downward in a curving fashion for partitioning the front seat protection portion 27 from the central sub inflatable portion 31 and regulates a thickness of this region.

The thickness regulating portion 48 is formed into a generally flat inverted U-shape and is located proximate to the front end of the gas feed path 25 and at the rear of the communication portion 33. The thickness regulating portion 48 prevents too much gas from flowing towards the communication portion 33 (i.e., towards the front sub inflatable portion 30) at deployment of the main inflatable portion 24 and prevents a front upper region of the front seat protection portion 27 integral with the gas feed path 25 from inflating too thick. The thickness regulating portion 49 is formed into a generally inverted J-shape and is located in a lower end region of the front seat protection portion 27. The thickness regulating portion 49 protrudes out of the lower edge region of the peripheral portion 43 forward and upwardly in a slanted fashion. The thickness regulating portion 50 is located in a lower end region of the central sub inflatable portion 31 and protrudes upward out of the lower edge region of the peripheral portion 43. The thickness regulating portion 51 is located in a vicinity of a border between the rear sub inflatable portion 32 and rear seat protection portion 28 and protrudes upward out of the lower edge region of the peripheral portion 43. The thickness regulating portion 52 is formed into a generally flat inverted V-shape and is located at the rear of the general partitioning portion 46 in an area of the rear seat protection portion 28. The upper end of the thickness regulating portion 52 protrudes further upward than the general partitioning portion 46. In the airbag 20 of the illustrated embodiment, a clearance between the terminal partitioning portion 44 and an upper edge region of the peripheral portion 43 forms the communication portion 33, and a clearance between the terminal partitioning portion 44 and the lower edge region of the peripheral portion 43 forms the communication portion 34. Further, a clearance between the curving partitioning portion 46a of the general partitioning portion 46 and the thickness regulating portion 50 forms the communication portion 35, and a clearance between the rear end of the general partitioning portion 46 and the thickness regulating portion 51 forms the communication portion 36.

The mounting tabs 54 serve to mount the upper edge 21a of the bag body 21 on the inner panel 2 of the vehicle body structure 1, and are provided in plurality along a front and rear direction of the upper edge 21a in a protruding fashion. As shown in FIG. 2, in the illustrated embodiment, the mounting tabs 54 include a terminal mounting tab 56 that is located at an upper edge of a front end region of the bag body 21 where the terminal inflatable portion 38 (front sub inflatable portion 30) is located, and general mounting tabs 55 that are disposed at an upper edge of the general inflatable portion 39. In the illustrated embodiment, there are disposed four general mounting tabs 55 along a front and rear direction. The general mounting tabs 55 mount the upper edge of the general inflatable portion 39 on the upper peripheries of the windows W1 and W2, and an upward protruding amount of each of the general mounting tabs 55 out of the bag body 21 is so determined that the general mounting tab 55 may not protrude downward out of the roof head liner 5 and be covered with the roof head liner 5 entirely. Each of the general mounting tabs 55 and terminal mounting tab 56 is provided with a mounting hole 55a/56a for receiving a mounting bolt 12. In the illustrated embodiment, the general mounting tabs 55 are prepared separately from the bag body 21 and is fabricated of a fabric woven of polyamide yarn, polyester yarn or the like in a similar fashion to the bag body 21, and are sewn to the bag body 21 with sewing threads.

Figure 3:
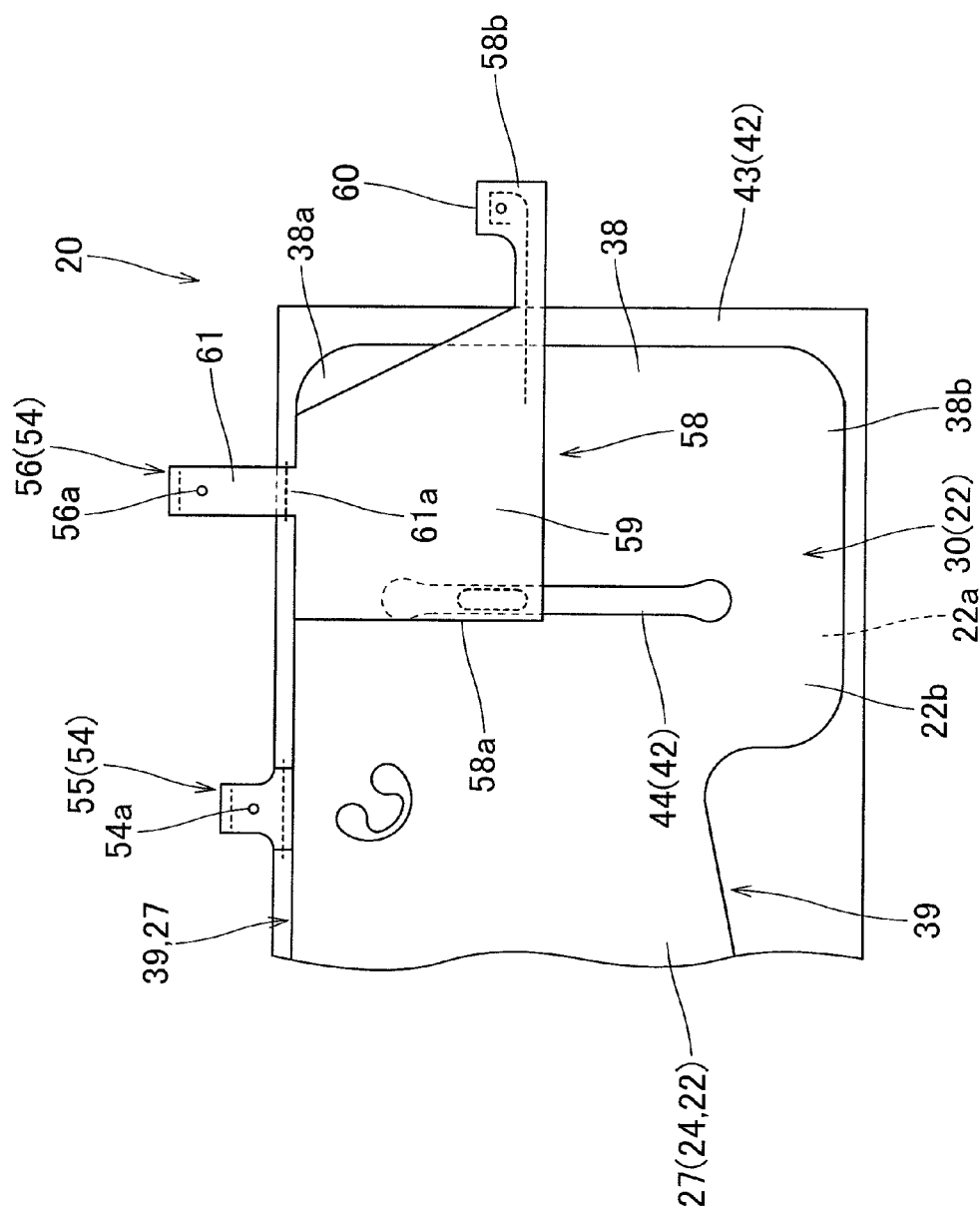
FIG. 3 is a partial enlarged rear view of the airbag of FIG. 2 particularly depicting a terminal inflatable portion and a tension cloth.
Figure 4:
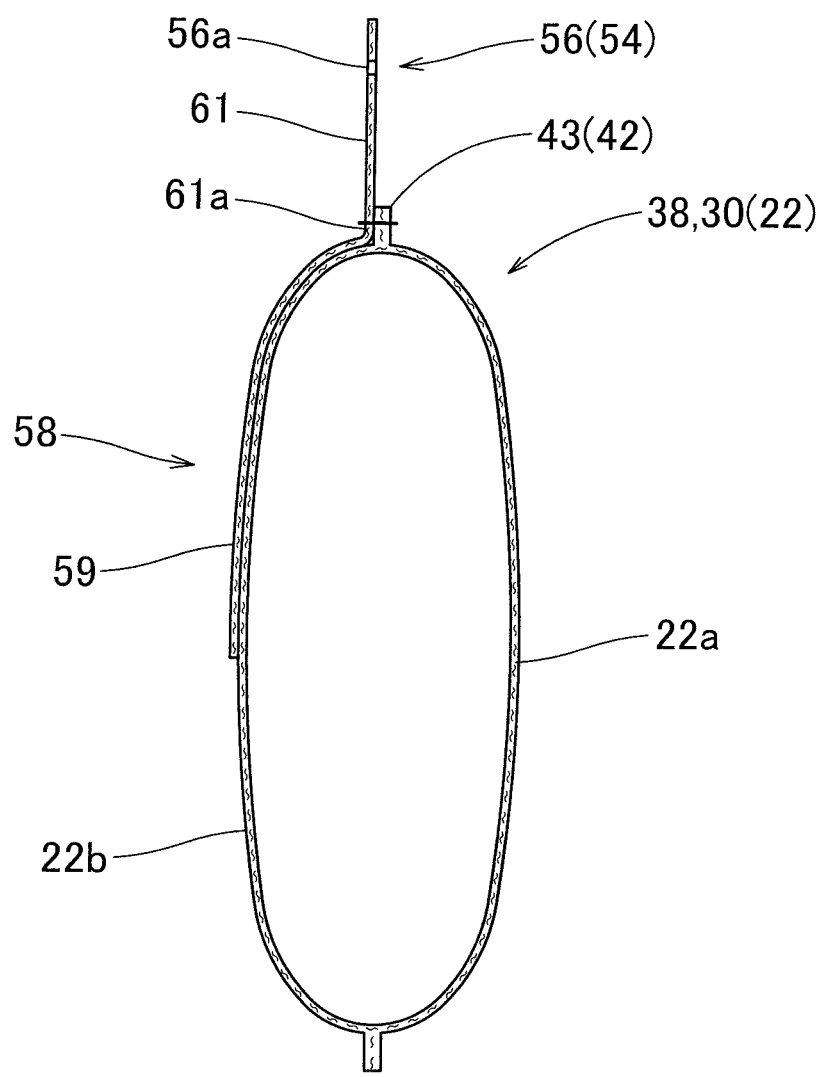
FIG. 4 is a partial enlarged sectional view taken along line IV-IV of FIG. 2.

In the illustrated embodiment, the terminal mounting tab 56 is formed in such a manner as to extend from the tension cloth 58 as described later and shown in FIGS. 3, 4 and 6, and is located at a farther forward position than an edge of the terminal partitioning portion 44 facing toward the general inflatable portion 39 (i.e., than the rear edge 44b). More specifically, the terminal mounting tab 56 is located above a position in front of the terminal partitioning portion 44 and at a generally center in a front and rear direction of the terminal inflatable portion 38, as shown in FIGS. 2 and 3. The mounting hole 56a is located in an upper end region of the terminal mounting tab 56, such that the upper end region is adapted to be mounted on the inner panel 2 at the front pillar FP. An upward protruding amount of the terminal mounting tab 56 out of the bag body 21 as unfolded in a flat fashion (i.e., a distance between the upper edge 21a of the bag body 21 and the mounting hole 56a) is greater than the protruding amount of each of the general mounting tabs 55 out of the bad body 21 (i.e., a distance between the upper edge 21a of the bag body 21 and the mounting hole 55a). In the illustrated embodiment, the terminal mounting tab 56 is adapted to be fixed to a region of the front pillar FP proximate to an upper or rear end of the front pillar FP, as shown in FIGS. 1 and 7. The terminal inflatable portion 38 is designed such that its upper end 38a region protrudes out of the front pillar garnish 4 and covers an inboard side of the front pillar garnish 4 at airbag deployment as shown in FIG. 7, and the terminal mounting tab 56 is deployed in such a manner as to make a detour around the lower hem of the front pillar garnish 4, i.e., around the airbag cover 9, as opened at airbag deployment, as shown in FIG. 9. The upward protruding amount (i.e., the length) of the terminal mounting tab 56 out of the bag body 21 is so determined as not to pull the terminal inflatable portion 38 in an undue fashion and locate the upper end 38a region of the terminal inflatable portion 38 at such a position that the upper end 38a region is supported by an upper end region of the front pillar garnish 4 at airbag deployment. In the illustrated embodiment, the length of the terminal mounting tab 56 (i.e., the distance between the upper edge 21a of the bag body 21 and the mounting hole 56a) is about four times of the length of each of the general mounting tabs 55 (i.e., the distance between the upper edge 21a of the bag body 21 and the mounting hole 55a).

Figure 5:
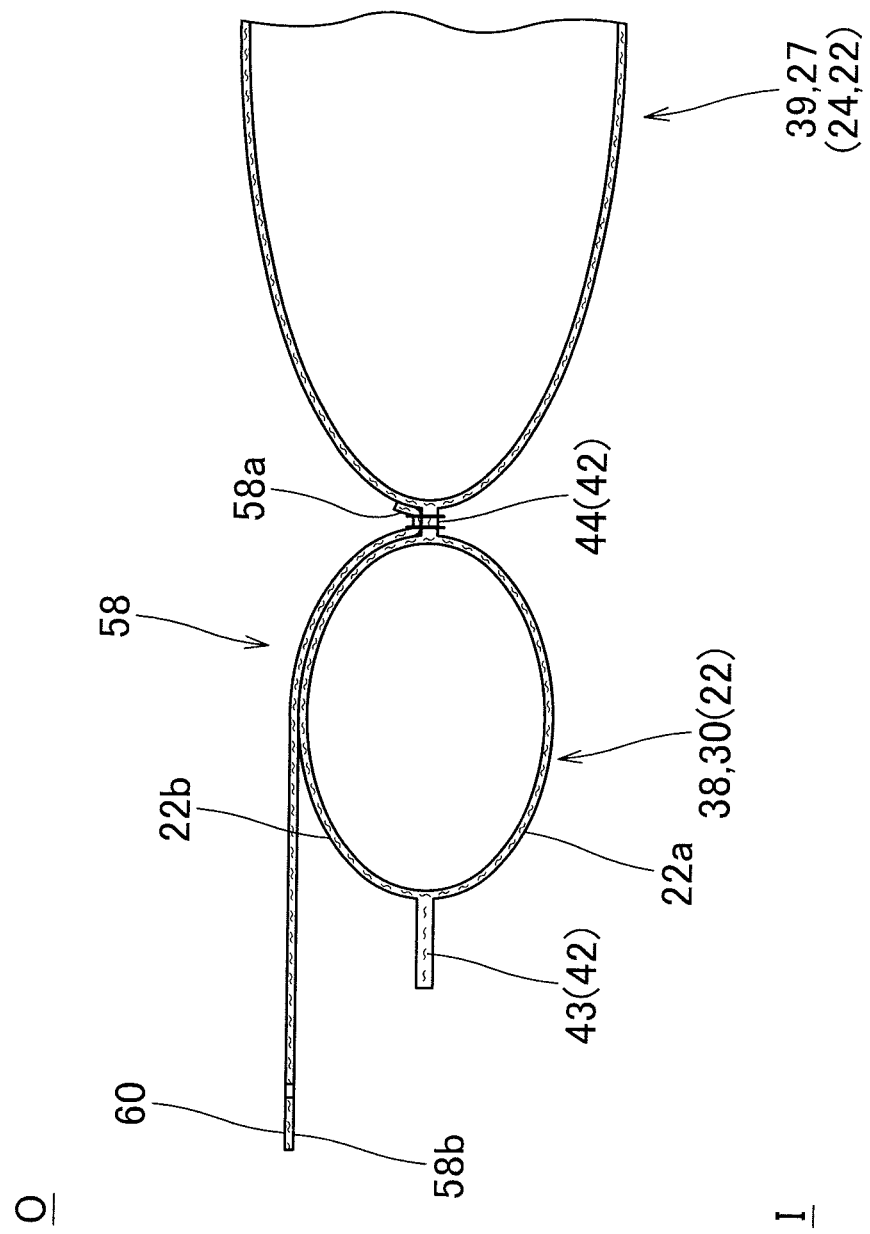
FIG. 5 is a partial enlarged sectional view taken along line V-V of FIG. 2.

The tension cloth 58 is formed of a flexible sheet member. The tension cloth 58 of the illustrated embodiment is fabricated of a fabric woven of polyamide yarn, polyester yarn or the like. As shown in FIGS. 3 to 5, the tension cloth 58 is disposed on an outboard side of the terminal inflatable portion 38 (the front sub inflatable portion 30), and is connected to the terminal partitioning portion 44 by its root portion 58a. As shown in FIGS. 3 and 6, the tension cloth 58 is formed into such a generally trapezoid in which an oblique side is located at the front, and is arranged at such a position that the upper edge is mated with the upper edge 21a of the bag body 21 and the lower edge is located slightly on the upper side than the center in an up and down direction of the terminal inflatable portion 38. That is, the tension cloth 58 entirely covers an outboard side of an upper half region of the terminal inflatable portion 38 by its support region 59 having a generally trapezoidal outer contour. The tension cloth 58 includes in the upper periphery a protruding region 61 having a generally band shape and protruding upward for forming the terminal mounting tab 56. As described above, the protruding region 61 protrudes upward at the generally center in a front and rear direction of the terminal inflatable portion 38 and a root region 61a of the protruding region 61 is sewn (connected) to the peripheral portion 43 above the terminal inflatable portion 38 with sewing threads, as shown in FIGS. 2 to 4. The tension cloth 58 further includes at the leading end (front end) 58b extending forward in such a manner as to continue from the lower edge of the support region 59 a mounting portion 60 which is adapted to be secured to the inner panel 2 of the vehicle body structure 1 at the front pillar FP. The mounting portion 60 is secured to the inner panel 2 with the aid of the mounting bracket 11 and mounting bolt 12 as shown in FIG. 8 as well as the mounting tabs 54, accordingly includes a mounting hole (reference numeral omitted) for receiving the mounting bolt 12. Further, a lower region of the rear edge in the root region 58a (a lower half region of the root region 58a) is sewn to the terminal partitioning portion 44 with sewing threads.

At airbag deployment as the airbag 20 is mounted on board, each of the front seat protection portion 27, rear seat protection portion 28, central sub inflatable portion 31 and rear sub inflatable region 32 is inflated from an uninflated state while contracting in dimension in a front and rear direction, thus a tension T is exerted generally along a front and rear direction between the mounting portion 60 located at the leading end 58b of the tension cloth 58 and the general mounting tab 55R located at the rear end of the bag body 21, as shown in FIG. 7.

Mounting of the head-protecting airbag device M on the vehicle V is now described. The tension cloth 58 is sewn to the bag body 21 in advance. From a flattened state where the inboard side wall 22a and outboard side wall 22b overlap each other, the bag body 21 is folded up together with the tension cloth 58 in such a manner that the lower edge 21b is brought close to the upper edge 21a. When the airbag 20 is folded up, a breakable wrapping member (not shown) is wrapped around predetermined regions of the airbag 20 for keeping the folded-up configuration.

Thereafter, the mounting bracket 16 is mounted on the inflator 14 and the inflator 14 is connected with the connection port 26 of the airbag 20 with the clamp 15. The mounting brackets 11 are attached to the mounting portion 60 of the tension cloth 58, the terminal mounting tab 56 and the general mounting tabs 55. Thus an airbag module is provided.

Subsequently, the mounting brackets 11 and 16 are located at predetermined positions on the inner panel 2 and fixed thereto with the bolts 12 and 17. Then, a not-shown lead wire extending from a suitable control for actuating the inflator is connected to the inflator 14. If then the front pillar garnish 4, the roof head liner 5 and the pillar garnishes 6 and 7 are mounted on the inner panel 2, the head-protecting airbag device M is mounted on the vehicle V.

After the airbag device M is mounted on the vehicle V, when the inflator 14 is actuated in response to an actuating signal fed from the control in the event of a side impact, an oblique crash or a rollover of the vehicle V, an inflation gas discharged from the inflator 14 flows into the bag body 21, and the bag body 21 then breaks the wrapping member, pushes and opens the airbag cover 9 constructed of the lower hems of the front pillar garnish 4 and roof head liner 5, and deploys downward and covers inboard sides of the windows W1, W2, the center pillar CP, and the rear pillar RP, as shown in FIG. 1 (double-dotted lines) and FIG. 7. At airbag deployment, since the tension T is exerted generally along a front and rear direction between the mounting portion 60 located at the leading end 58b of the tension cloth 58 and the general mounting tab 55R located at the rear end of the bag body 21, in other words, from the tension cloth 58 to the general inflatable portion 39, as shown in FIG. 7, the tension cloth 58 subjected to the tension T pushes the terminal inflatable portion 38 towards the interior I of the vehicle V and deploys the terminal inflatable portion 38 in such a slanted fashion that the front edge 38c is directed toward the vehicle interior I, as shown in FIG. 8.

In the head-protecting airbag device M of the foregoing embodiment, the terminal mounting tab 56 disposed at the upper edge of a vicinity of the terminal inflatable portion 38 in the airbag 20 is designed to be mounted on the vehicle body structure 1 by the upper end of the terminal mounting tab 56, and the upward protruding amount of the terminal mounting tab 56 out of the bag body 21 as unfolded in a flat fashion is greater than that of each of the general mounting tabs 55 for mounting the upper edge of the general inflatable portion 39 on the upper peripheries of the windows W1 and W2. That is, since the terminal mounting tab 56, which mounts the upper end of the vicinity of the terminal inflatable portion 38 on the vehicle body structure 1, has a greater length than the general mounting tabs 55, the terminal mounting tab 56 will not hinder such a deployment behavior of the terminal inflatable portion 38 that is pushed inward by the tension cloth 58 in such a manner as to direct the front edge 38c (i.e., the edge in a front and rear direction) toward the vehicle interior I. Accordingly, the terminal inflatable portion 38 will be deployed toward the vehicle interior I smoothly generally entirely in an up and down direction. Moreover, since the terminal mounting tab 56 will be deployed at airbag deployment in such a manner as to extend from the mounting hole 56a to an upper side of the upper end 38a of the terminal inflatable portion 38 while passing under the lower edge of the airbag cover 9, the terminal mounting tab 56 will allow the upper end 38a region of the terminal inflatable portion 38 to be smoothly deployed on an inboard side of the front pillar garnish 4 of the front pillar FP and cover the inboard side of the front pillar garnish 4 extensively although the front pillar FP protrudes farther towards the vehicle interior I than the window W1.

Therefore, the head-protecting airbag device M of the foregoing embodiment will be capable of deploying the upper end 38a region of the terminal inflatable portion 38 supported by the tension cloth 58 on the inboard side of the front pillar FP smoothly at airbag deployment.

Further, in the head-protecting airbag device M, although the terminal mounting tab 56 is adapted to be mounted on the vehicle body structure 1 at the front pillar FP, the great length of the terminal mounting tab 56 will allow the upper end 38a region of the terminal inflatable portion 38 supported by the tension cloth 58 to pass under the front pillar garnish 4 protruding toward the vehicle interior I and cover the inboard side of the front pillar FP (front pillar garnish 4) smoothly as shown in FIG. 9. In the event of an oblique crash, the terminal inflatable portion 38 thus supported by the front pillar FP (front pillar garnish 4) will protect a head of an occupant moving obliquely forward and towards an outboard direction adequately. Moreover, the terminal inflatable portion 38 is deployed in such a manner that the upper end 38a region covers the inboard side of the front pillar garnish 4 and the lower end 38b region is deployed on the lower side of the beltline BL as shown in FIGS. 7 and 9. That is, when the terminal inflatable portion 38 catches a head of an occupant moving obliquely forward and towards an outboard direction, it will protect the head adequately since the terminal inflatable portion 38 is supported by the front pillar garnish 4 at the upper end 38a and supported at the lower end 38b by such a member of the vehicle protruding further inward than the window W1 below the beltline BL as a door trim.

Furthermore, since the terminal inflatable portion 38 is designed to be deployed in an area of the front pillar FP disposed in front of the window W1 and the terminal inflatable portion 38 and the general inflatable portion 39 cover the inboard side of the window W1 extensively, the terminal inflatable portion 38 and general inflatable portion 39 will arrest and protect a head of an occupant which would otherwise be thrown out of the vehicle V in the event of a rollover.

In the head-protecting airbag device M, since the terminal mounting tab 56 fixes the upper end 38a of the terminal inflatable portion 38 to the vehicle body structure 1, the terminal inflatable portion 38 will be prevented from being pushed inward by the tension cloth 58 more than necessary at airbag deployment. Although the terminal inflatable portion 38 is deployable on the inboard side of the front pillar FP which protrudes further towards the vehicle interior I than the window W1 and located proximate to the instrument panel, the terminal inflatable portion 38 will be prevented from contacting an airbag for a front passenger seat, an airbag for a steering wheel or the like deployed in proximity in the vehicle interior I, thus will complete deployment quickly. Moreover, since the terminal mounting tab 56 fixes the upper end 38a of the terminal inflatable portion 38 to the vehicle body structure 1, it will prevent the terminal inflatable portion 38 moving further downward than the general inflatable portion 39 at airbag deployment and thus enable the terminal inflatable portion 38 to cover the upper periphery of the window W1 immediately below the front pillar FP in an adequate fashion. Moreover, as described above, since the terminal inflatable portion 38 is supported at the upper end 38a and the lower end 38b by the front pillar garnish 4 and door trim which protrude further toward the vehicle interior I than the window W1, it will prevent an occupant's head from moving toward an exterior O and protect it in a further adequate fashion.

In the head-protecting airbag device M, the terminal mounting tab 56 is composed of the protruding region 61 extending from the tension cloth 58 and the root region 61a of the protruding region 61 is connected to the upper edge of the terminal inflatable portion 38 in the bag body 21. With this configuration, the tension cloth 58 is able to cover the outboard side of the terminal inflatable portion 38 to the upper end 38a with the aid of the terminal mounting tab 56, thus will able to push an extensive area in an up and down direction of the terminal inflatable portion 38 toward the vehicle interior I and help deploy the terminal inflatable portion 38 in the vehicle interior I at airbag deployment. In the foregoing embodiment, especially, since the tension cloth 58 is generally trapezoid in outer contour and includes the support region 59 that covers the outboard side of a generally upper half region of the terminal inflatable portion 38, the tension cloth 58 will be able to push a generally entire area of the upper half region of the terminal inflatable portion 38 toward the vehicle interior I and deploy the terminal inflatable portion 38 in the vehicle interior I in a steady fashion at airbag deployment. The outer contour of the tension cloth provided with the terminal mounting tab should not be limited to the foregoing embodiment. By way of example, such tension cloth may be formed into a generally L or T shape which includes a first band-shaped member and a second band-shaped member extending upward from the first band-shaped member for forming the terminal mounting tab.

Moreover, in the head-protecting airbag device M, the terminal mounting tab 56 is located at a position further toward the front than the terminal partitioning portion 44, in particular, at the generally center in a front and rear direction of the terminal inflatable portion 38. This configuration will help prevent the upper end 38*a* region of the terminal inflatable portion 38 from protruding toward the vehicle interior I more than necessary and fix the upper end 38*a* region of the terminal inflatable portion 38 to the vehicle body structure 1 in a steady fashion.

Figure 10:
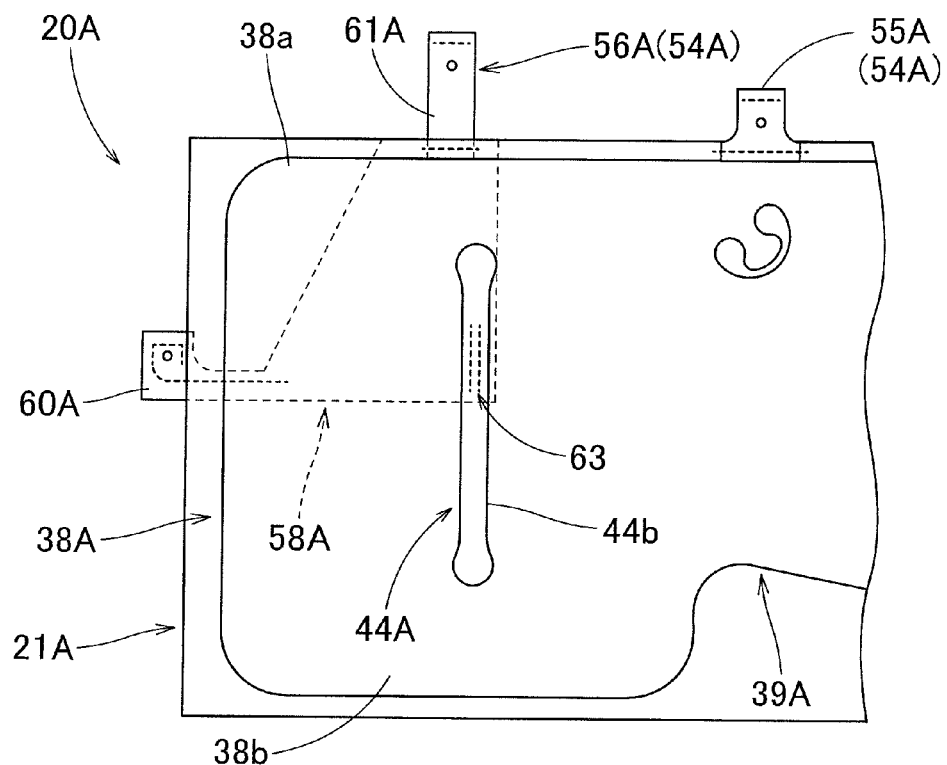
FIG. 10 is a partial enlarged front view of an airbag of an alternative embodiment of the invention.
Figure 11:
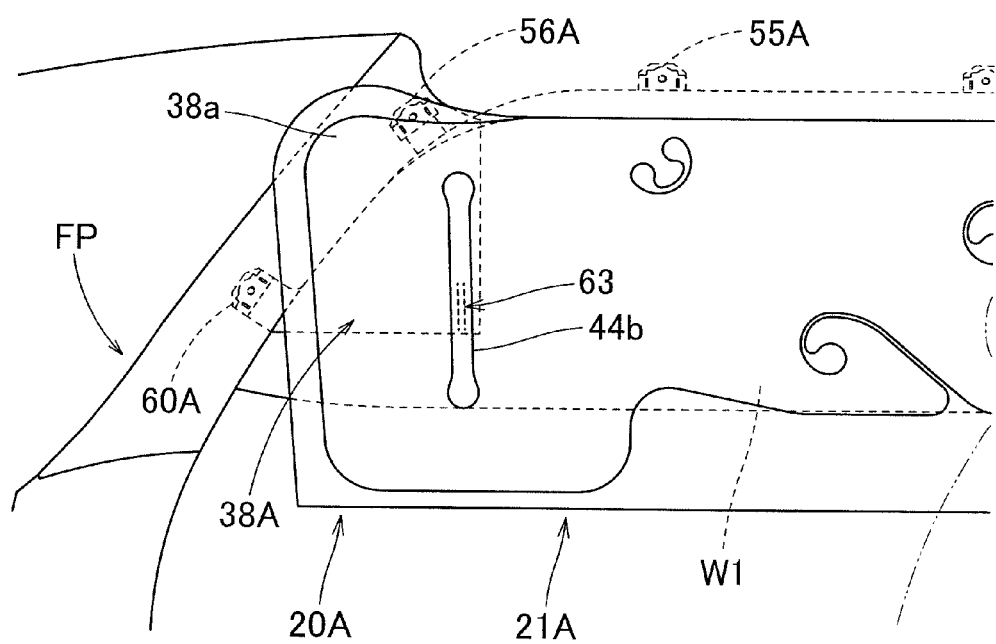
FIG. 11 is a schematic partial enlarged front view of the airbag of FIG. 10 as mounted on board and deployed, viewed from a vehicle interior.

If such advantageous effects do not have to be considered, the terminal mounting tab 56A may be located generally immediately above a joint 63 that connects the tension cloth 58A to the terminal partitioning portion 44A, as in an airbag 20A shown in FIG. 10. In the airbag 20A, the terminal inflatable portion 38A and the terminal partitioning portion 44A disposed at the rear of the terminal inflatable portion 38A are shifted further to the front in comparison with the terminal inflatable portion 38 and the terminal partitioning portion 44 of the bag body 21. The airbag 20A includes a bag body 21A with a slightly greater width in a front and rear direction in comparison with the bag body 21 of the foregoing embodiment, a tension cloth 58A with a smaller width in a front and rear direction for an amount that the terminal inflatable portion 38A is shifted forward and a plurality of mounting tabs 54A that mount an upper edge 21*a* of the bag body 21A on the inner panel 2. The bag body 21A and tension cloth 58A have slightly different contours from the bag body 21 and tension cloth 58 of the airbag 20 described above but have similar configurations to them. Therefore, detailed descriptions will be omitted for common members and parts by assigning "A" to the ends of their common reference numerals. Further, since the mounting tabs 54A also have the same configurations as the mounting tabs 54 of the airbag 20, they will be shown with the common reference numeral plus "A," and their detailed description will be omitted. In the airbag 20A, the terminal partitioning portion 44A is located generally immediately below the terminal mounting tab 56A. The joint 63 that connects the tension cloth 58A to the terminal partitioning portion 44A is formed into a generally double line unlike the airbag 20, and is located at a position further to the front than the rear edge 44*b* of the terminal partitioning portion 44A (specifically, at a generally center in a front and rear direction of the terminal partitioning portion 44A). In particular, a rear edge of the terminal mounting tab 56A is located generally immediately above the joint 63 and further to the front than the rear edge 44*b* of the terminal partitioning portion 44A (i.e., than an edge of the terminal partitioning portion 44A facing towards the general inflatable portion 39A). The airbag 20A is so designed as to deploy the terminal partitioning portion 44A in proximity to the front pillar FP as mounted on board and deployed, as shown in FIG. 11. Also in this airbag 20A, since the terminal mounting tab 56A is located further to the front than the rear edge 44*b* of the terminal partitioning portion 44A around which the terminal inflatable portion 38A bends relative to the general inflatable portion 39A, an undue protrusion of the upper end 38*a* region of the terminal inflatable portion 38A will be prevented.

Figure 21:
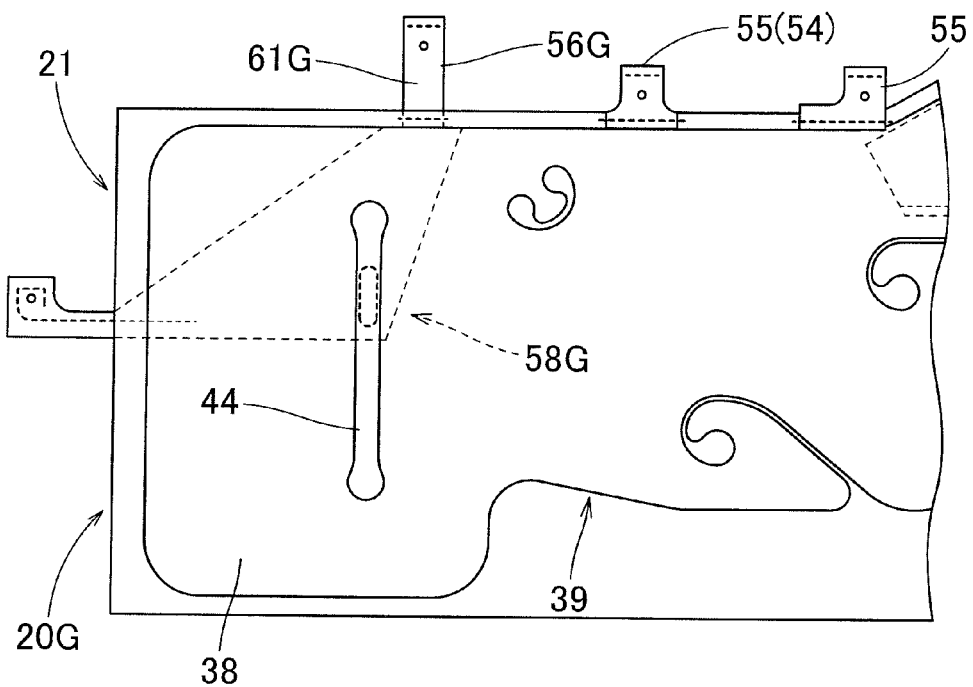
FIG. 21 is a partial enlarged front view of an airbag of yet another alternative embodiment of the invention.

FIG. 21 depicts an airbag 20G, i.e., an alternative embodiment for controlling a protruding degree of the upper end 38*a* region of the terminal inflatable portion 38 in an adequate fashion, in which a terminal mounting tab 56G (i.e., a protruding region 61G) as a part of a tension cloth 58G is located slightly further rearward than the terminal partitioning portion 44 and proximate the terminal inflatable portion 38. In this airbag 20G, although not depicted in the drawings in detail, the terminal mounting tab 56G (i.e., the protruding region 61G) is adapted to be mounted on the inner panel in an area of the roof side rail continuous with the front pillar and extending along the upper periphery of the window, in a similar fashion to a later-described airbag 20H. This configuration will enable the airbag 20G to be folded up from a flattened state, before mounted on a vehicle, through such a folding process that the terminal inflatable portion 38 is firstly folded back toward the general inflatable portion 39 on a vicinity of the terminal partitioning portion 44 and then the bag body 21 is folded up in such a manner that the lower end region is brought close to the upper end region. The bag body 21 thus folded up into a generally rod, including the terminal inflatable portion 38, can be mounted only in the area of the roof side rail extending along a front and rear direction and located away from the front pillar. In other words, if the airbag 20G is folded up as described above, only the tension cloth 58 is mounted on an area of the front pillar FP disposed at a slant relative to a front and rear direction, thus the airbag 20G will be mounted on a vehicle smoothly even if the front pillar has a limited inner space. Further, since the bag body 21 is folded up into a generally rod, i.e., into a contour easy to mount on the generally straight roof side rail, mounting of the airbag 20G on the vehicle body will be conducted efficiently.

Figure 12:
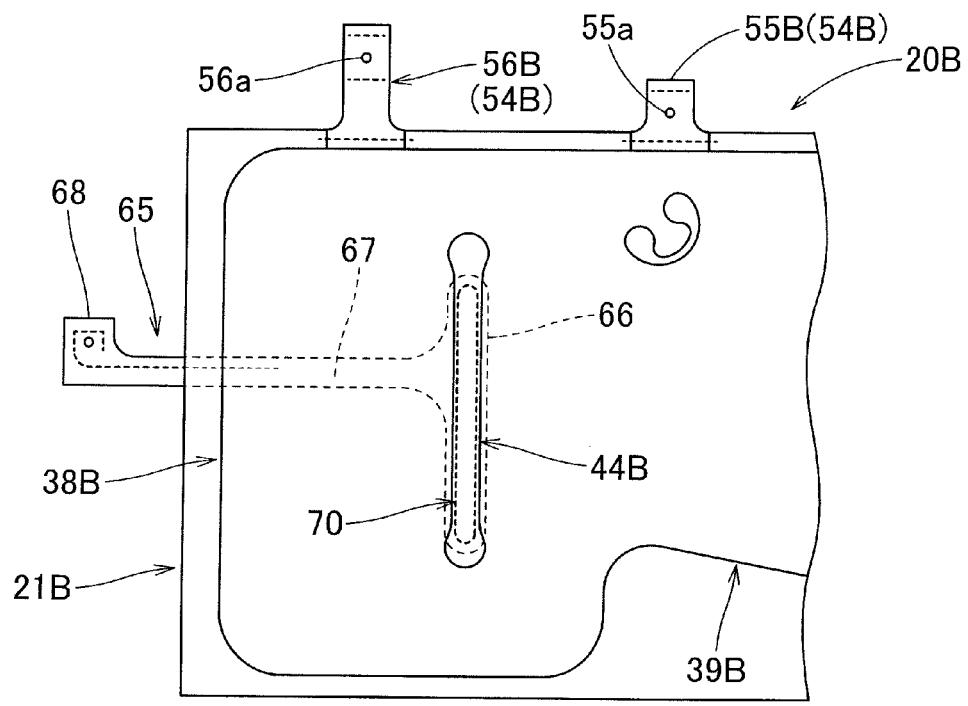
FIG. 12 is a partial enlarged front view of an airbag of another alternative embodiment of the invention.
Figure 13:
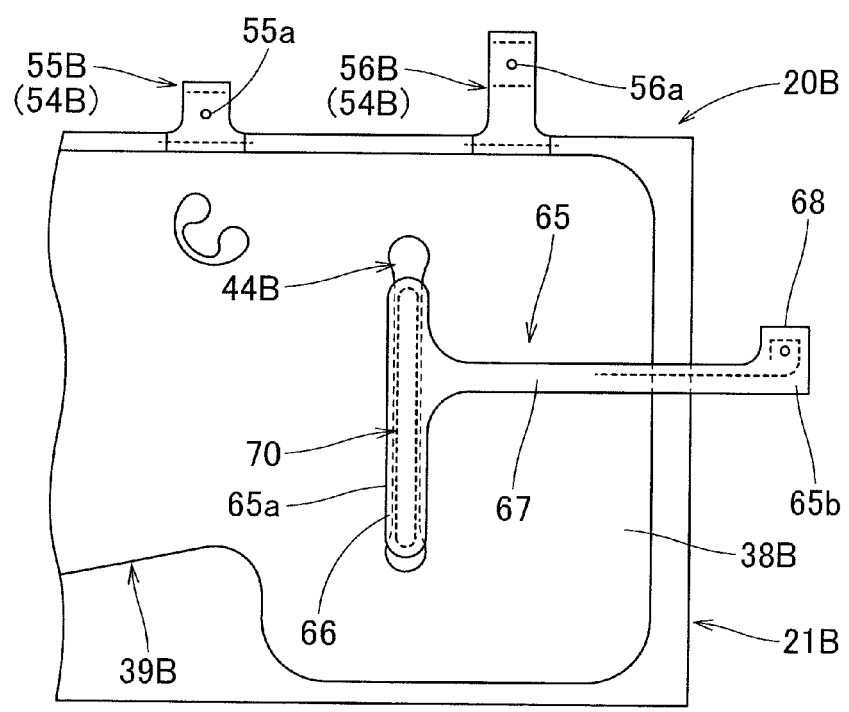
FIG. 13 is a partial enlarged rear view of the airbag of FIG. 12.

FIGS. 12 and 13 depict an airbag 20B, another alternative embodiment in which a terminal mounting tab 56B is separate from a tension cloth 65. In the airbag 20B, the terminal mounting tab 56B is prepared separate from the tension cloth 65 and a bag body 21B as well as general mounting tabs 55B. The terminal mounting tab 56B has a generally same configuration as the terminal mounting tab 56 of the above-described airbag 20 except in that it is formed separate from the tension cloth 65. Specifically, an upward protruding amount of the terminal mounting tab 56B out of the upper edge 21*a* of the bag body 21B and a location of the terminal mounting tab 56B relative to the terminal partitioning portion 44B are generally the same as those of the terminal mounting tab 56 of the above-described airbag 20. Since the bag body 21B and mounting tabs 54B (general mounting tabs 55B) have the same configurations as counterparts of the above-described airbag 20, they will be shown with the common reference numerals plus "B," and their detailed descriptions will be omitted.

The tension cloth 65 is fabricated of a fabric woven of polyamide yarn, polyester yarn or the like, and is disposed on an outboard side of the terminal inflatable portion 38B. The tension cloth 65 includes a mounting base 66 which is formed into a band extending generally along an up and down direction at the root region 65*a* and a belt section 67 protruding forward from a slightly upper position than the center in an up and down direction of the mounting base 66, thus is formed into a generally T shape as shown in FIG. 13. A mounting portion 68 is formed at the leading end 65*b* of the tension cloth 65, i.e., at the front end of the belt section 67, to be mounted on the inner panel 2 of the vehicle body structure 1. The mounting base 66 is coupled to the terminal partitioning portion 44B, and its length is slightly shorter than that of the terminal partitioning portion 44B. The mounting base 66 is sewn to the terminal partitioning portion 44B over an entire area in an up and down direction. A joint 70 that couples the mounting base 66 to the terminal partitioning portion 44B is formed into an oval generally similar to the mounting base 66. That is, the mounting base 66 is coupled to the terminal partitioning portion 44B generally entirely.

Since the terminal mounting tab 56B is separate from the tension cloth 65, the configuration of the airbag 20B will save a base material in comparison with the configuration of the above-described airbag 20 that the terminal mounting tab 56 is integral with the tension cloth 58, and contribute to size and weight saving of the device. Further, also in the airbag 20B, the terminal mounting tab 56B is located at a position further to the front than the terminal partitioning portion 44B, in particular, at the generally center in a front and rear direction of the terminal inflatable portion 38B. This configuration will help prevent the upper end 38a region of the terminal inflatable portion 38B from protruding toward the vehicle interior I more than necessary and fix the upper end 38a region of the terminal inflatable portion 38B to the vehicle body structure 1 in a steady fashion. Further, since the tension cloth 65 of the airbag 20B is connected to the terminal partitioning portion 44B by the mounting base 66 at the root region 65a over an extensive area in an up and down direction (over a generally entire area in an up and down direction of the terminal partitioning portion 44B), the belt section 67 will pull the vertically extensive area of the terminal partitioning portion 44B and help generate a great tension between the mounting portion 68 formed at the leading end 65b of the tension cloth 65 and a not-shown general mounting tab located at the rear end region of the bag body 21B at airbag deployment, thus improving an occupant arresting performance in the event of a side impact.

Figure 14:
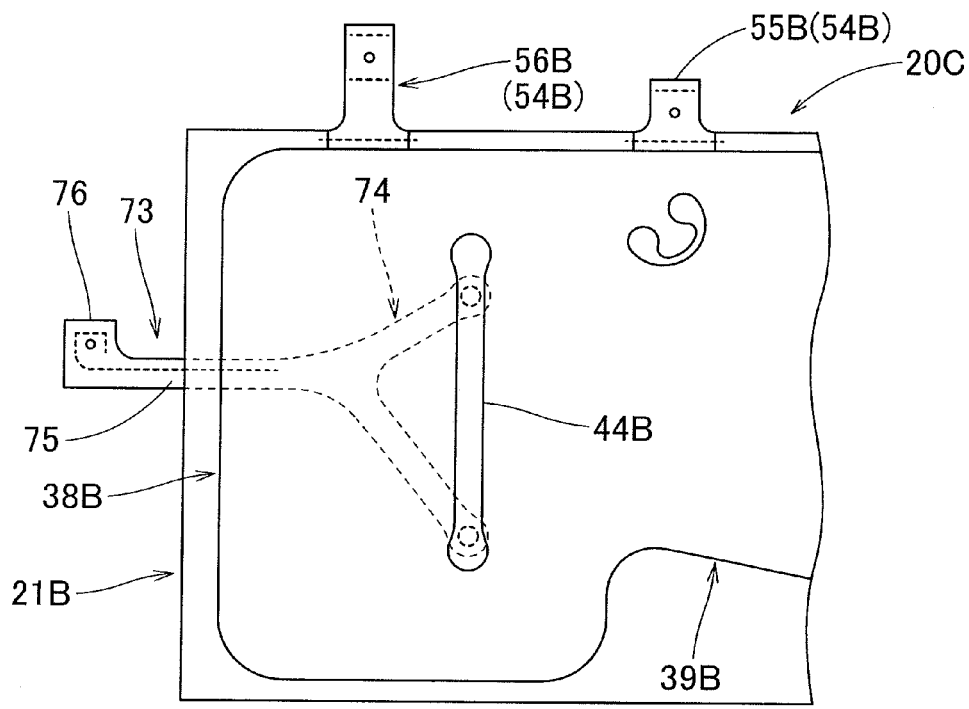
FIG. 14 is a partial enlarged front view of an airbag of yet another alternative embodiment of the invention.
Figure 15:
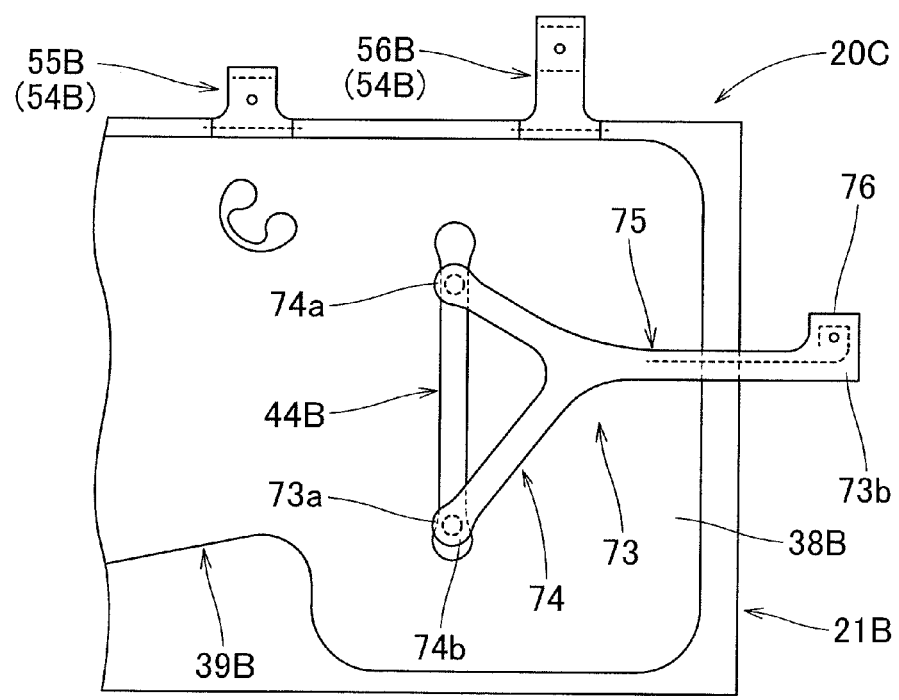
FIG. 15 is a partial enlarged rear view of the airbag of FIG. 14.

FIGS. 14 and 15 depict an airbag 20C, an alternative embodiment in which a terminal mounting tab is separate from a tension cloth 73. Since the airbag 20C has the same configuration as the above-described airbag 20B except the tension cloth 73, common members and parts will be shown with common reference numerals with those of the airbag 20B and their detailed descriptions will be omitted. The tension cloth 73 is fabricated of a fabric woven of polyamide yarn, polyester yarn or the like, and is disposed on an outboard side of the terminal inflatable portion 38B. The tension cloth 73 includes a belt section 75 and a mounting base 74 which bifurcates upwardly and downwardly at the root region of the belt section 75 and extends in a spreading fashion, thus is formed into a generally Y shape as shown in FIG. 15. The tension cloth 73 is sewn to upper and lower end regions of the terminal partitioning portion 44B by the root region 73a, i.e., by the ends 74a and 74b, respectively, of the mounting base 74 with sewing threads. A mounting portion 76 is formed at the leading end 73b of the tension cloth 73, i.e., at the front end of the belt section 75, to be mounted on the inner panel 2 of the vehicle body structure 1. Since the tension cloth 73 is connected to regions apart from each other in an up and down direction of, i.e., to the upper and lower end regions of, the terminal partitioning portion 44B by the mounting base 74 at the root region 73a, the belt section 75 will also pull a vertically extensive area of the terminal partitioning portion 44B and help generate a great tension between the mounting portion 76 formed at the leading end 73b of the tension cloth 73 and a not-shown general mounting tab located at the rear end region of the bag body 21B at airbag deployment, thus improving an occupant arresting performance in the event of a side impact.

Figure 16:
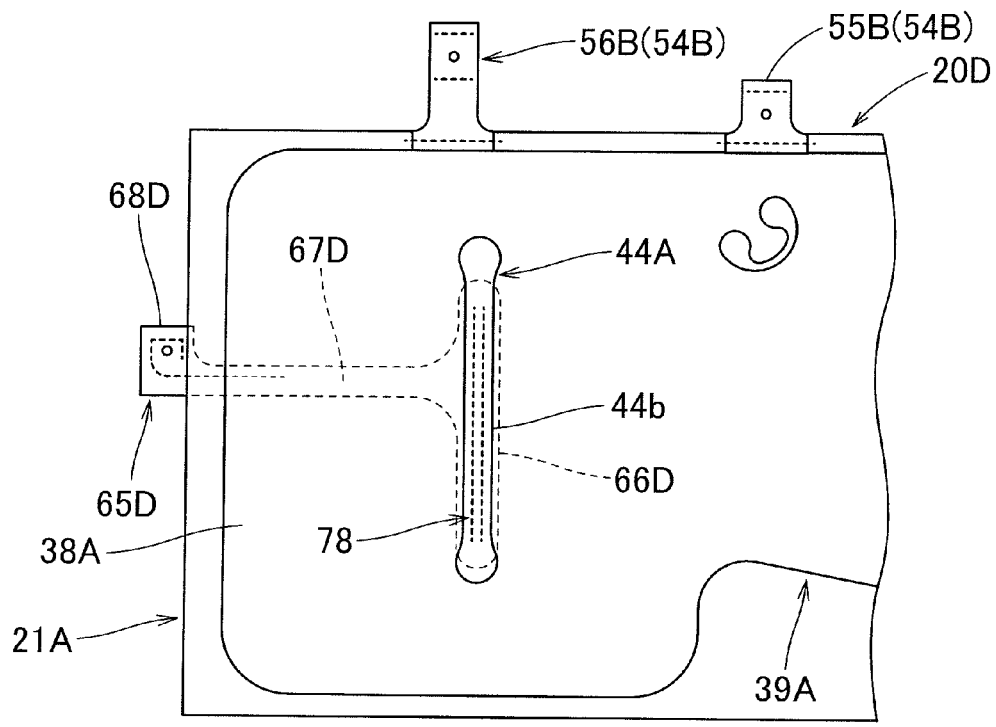
FIG. 16 is a partial enlarged front view of an airbag of yet another alternative embodiment of the invention.

FIG. 16 depicts an airbag 20D, a further modification in which a terminal mounting tab 56B separate from a tension cloth 65D is located immediately above a joint 78 that couples the tension cloth 65D to a terminal partitioning portion 44A. The airbag 20D includes a bag body 21A, the tension cloth 65D and mounting tabs 54B for mounting an upper edge 21a of the bag body 21A on the inner panel 2. Since the bag body 21A has the same configuration as the bag body 21A of the above-described airbag 20A, common members and parts will be shown with common reference numerals with those of the airbag 20A and their detailed descriptions will be omitted. The tension cloth 65D has a similar configuration to the tension cloth 65 of the above-described airbag 20B except in that the width in a front and rear direction is reduced for an amount that the terminal inflatable portion 38A of the airbag 20A is shifted forward, and therefore, common members with those of the airbag 20B will be shown with common reference numerals with "D", and their detailed descriptions will be omitted. Further, each of the mounting tabs 54B has the same configuration as that of the mounting tab 54B of the above-described airbag 20B, and therefore, it will be shown with the common reference numeral and its detailed description will be omitted. In the airbag 20D, the terminal partitioning portion 44A is located generally immediately below the terminal mounting tab 56B. The joint 78 that connects the tension cloth 65D to the terminal partitioning portion 44A is formed into a generally double line unlike the joint 70 of the above-described airbag 20B, and is located at a position apart to the front from the rear edge 44b of the terminal partitioning portion 44A (specifically, at a generally center in a front and rear direction of the terminal partitioning portion 44A). In particular, a rear edge of the terminal mounting tab 56B is located generally immediately above the joint 78 and further to the front than the rear edge 44b of the terminal partitioning portion 44A (i.e., than an edge of the terminal partitioning portion 44A facing towards a general inflatable portion 39A). This configuration of the airbag 20D will also help save a base material and contribute to size and weight saving of the device, since the terminal mounting tab 56B is separate from the tension cloth 65D. Moreover, since the terminal mounting tab 56B is located further to the front than the rear edge 44b of the terminal partitioning portion 44A around which the terminal inflatable portion 38A bends relative to the general inflatable portion 39A at airbag deployment, an undue protrusion of the upper end 38a region of the terminal inflatable portion 38A will be prevented.

Figure 22:
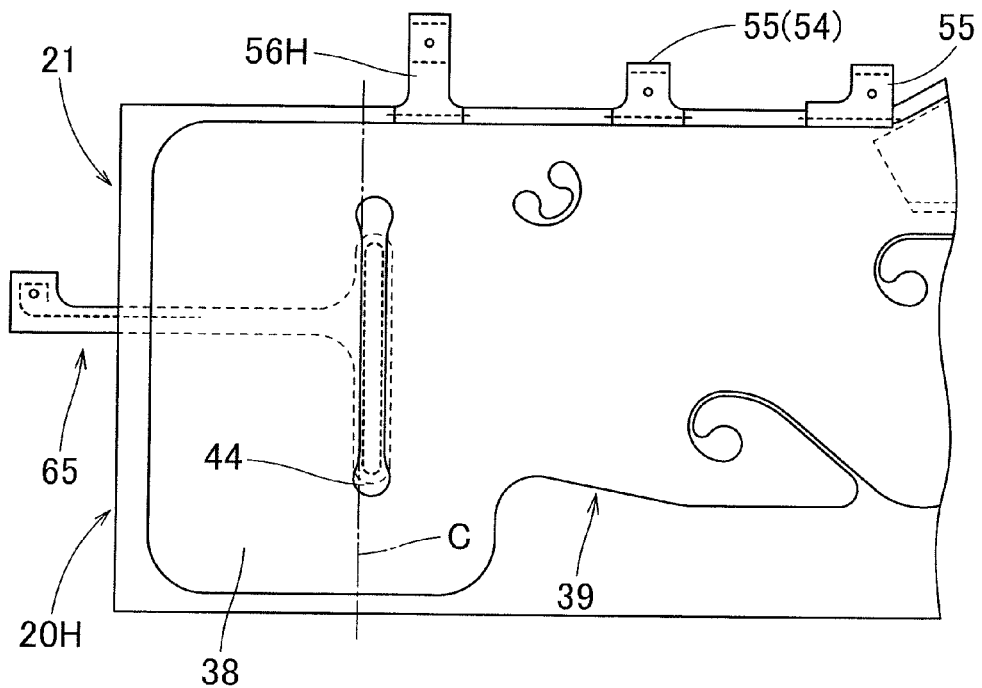
FIG. 22 is a partial enlarged front view of an airbag of yet another alternative embodiment of the invention.
Figure 23A:
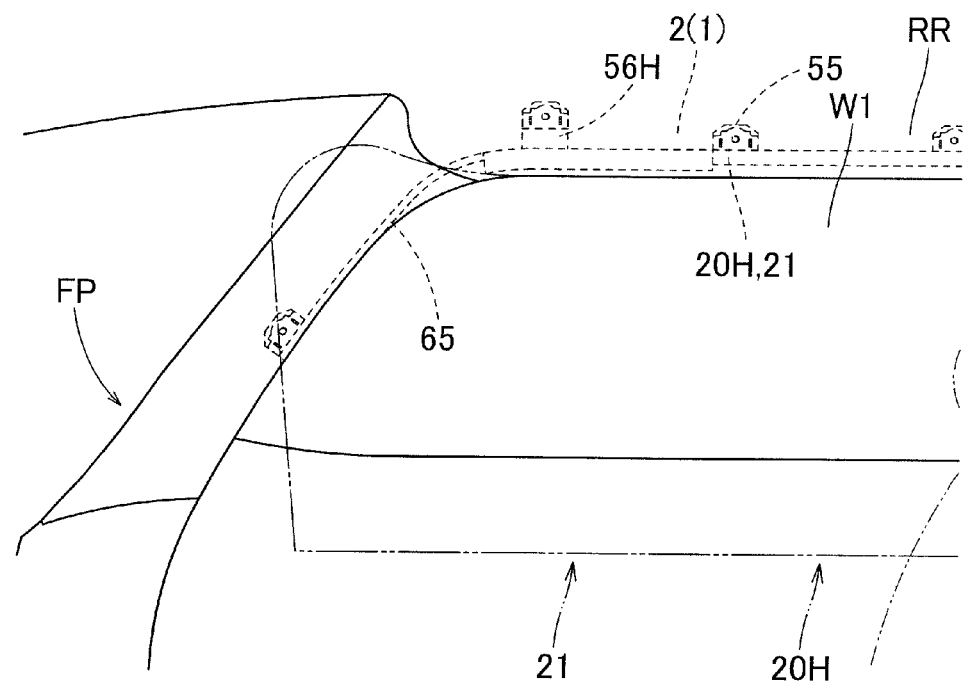
FIG. 23A is a schematic partial enlarged view showing the way the airbag of FIG. 22 is mounted on a vehicle as viewed from an interior of the vehicle.
Figure 23B:
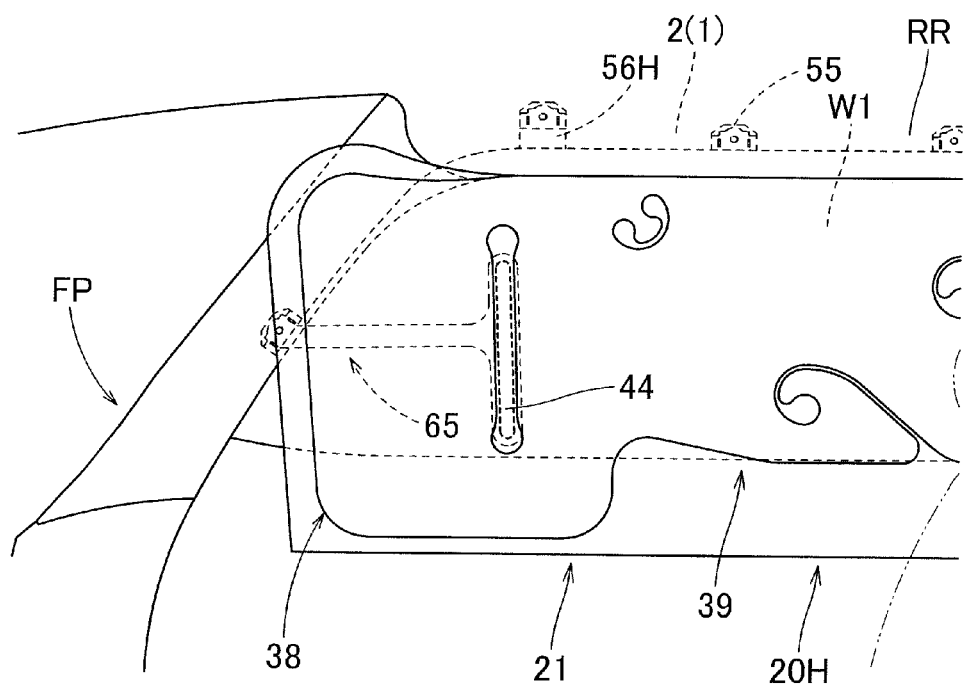
FIG. 23B is a schematic partial enlarged view of the airbag of FIG. 22 at deployment as viewed from the interior of the vehicle.

Even if a terminal mounting tab 56H is formed separate from a tension cloth 65, the terminal mounting tab 56H may also be located proximate the terminal inflatable portion 38 and slightly further rearward than the terminal partitioning portion 44 for controlling a protruding degree of the upper end 38a region of the terminal inflatable portion 38 in an adequate fashion, as in an airbag 20H shown in FIG. 22. In this airbag 20H, as shown in FIG. 23B, the terminal mounting tab 56H is adapted to be mounted on the inner panel 2 in an area of the roof side rail RR continuous with the front pillar FP and extending along the upper periphery of the window W1. This configuration will enable the airbag 20H to be folded up from a flattened state, before mounted on a vehicle, through such a folding process that the terminal inflatable portion 38 is firstly folded back toward the general inflatable portion 39 on a crease C in a vicinity of the terminal partitioning portion 44 (FIG. 22), and then the bag body 21 is folded up in such a manner that the lower end region is brought close to the upper end region. The bag body 21 thus folded up into a generally rod, including the terminal inflatable portion 38, can be mounted only in the area of the roof side rail RR extending along a front and rear direction and located away from the front pillar FP, as shown in FIG. 23A. In other words, if the airbag 20H is folded up as described above, only the tension cloth 65 is mounted on an area of the front pillar FP extending at a slant relative to a front and rear direction (FIG. 23A), thus the airbag 20H will be mounted on a vehicle smoothly even if the front pillar FP has a limited inner space. Further, since the bag body 21 is folded up into a generally rod, i.e., into a contour easy to mount on the generally straight roof side rail RR, mounting of the airbag 20H on the vehicle body 1 will be conducted efficiently.

Figure 17:
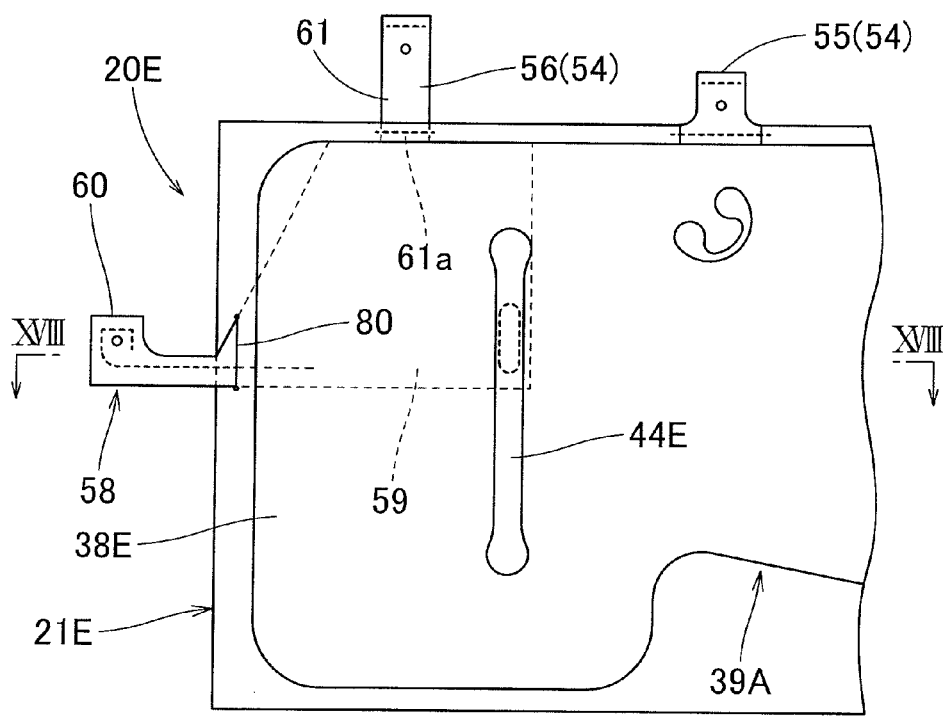
FIG. 17 is a partial enlarged front view of an airbag of yet another alternative embodiment of the invention.
Figure 18:
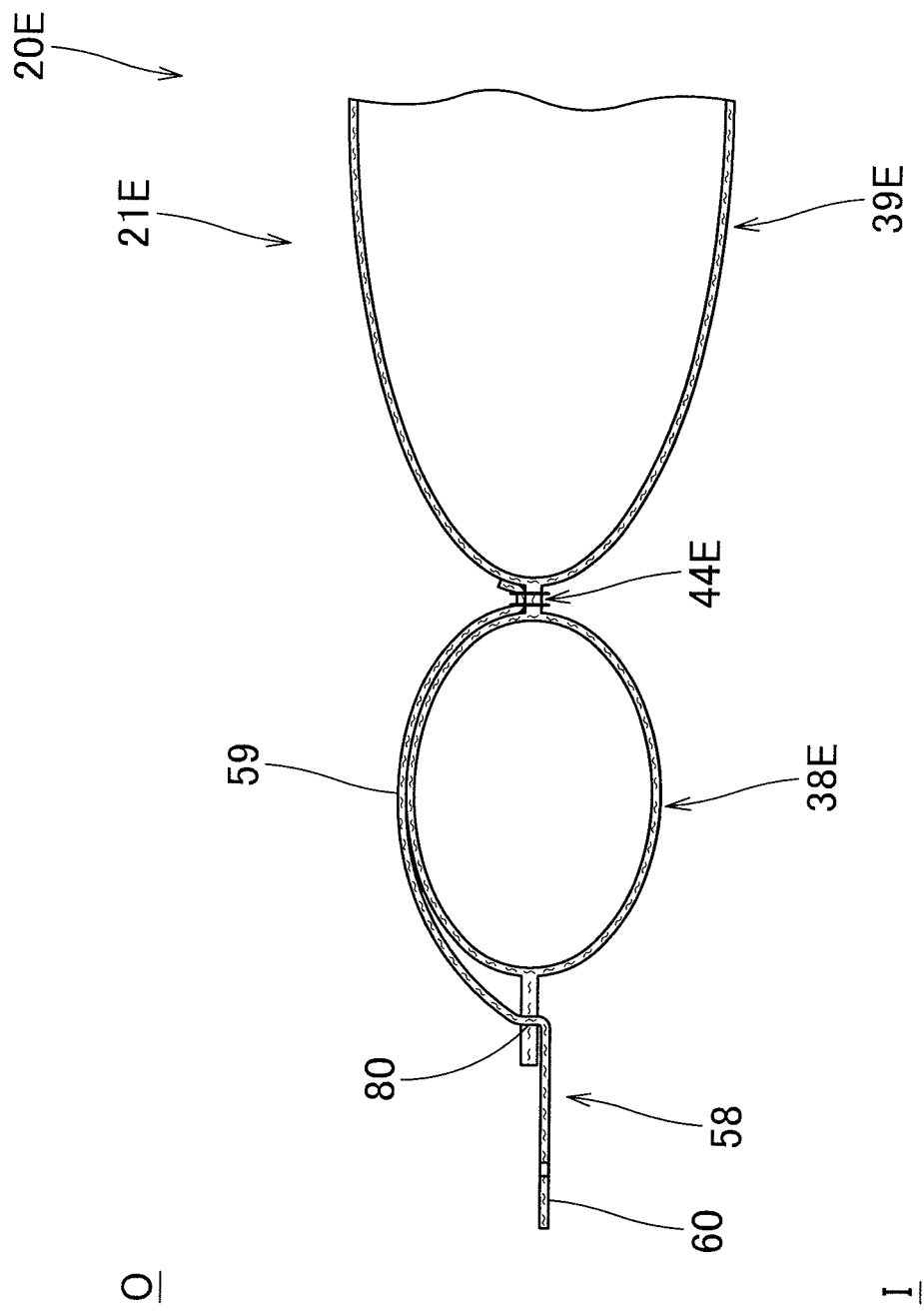
FIG. 18 is a partial enlarged sectional view taken along line XVIII-XVIII of FIG. 17.

FIGS. 17 and 18 depict an airbag 20E which includes in a front edge region of a peripheral portion 43A of a bag body 21E (i.e., in a front edge of a terminal inflatable portion 38E) a slit 80 for permitting the passage of a tension cloth 58. The tension cloth 58 is put through the slit 80. This configuration will help fix the location of the tension cloth 58 against the bag body 21E with the aid of a periphery of the slit 80, and facilitate folding of the bag body 21E integrally with the tension cloth 58. Thus, the work efficiency at folding the bag body 21E together with the tension cloth 58 by, for example, rolling from the lower edge, will be improved.

Figure 19:
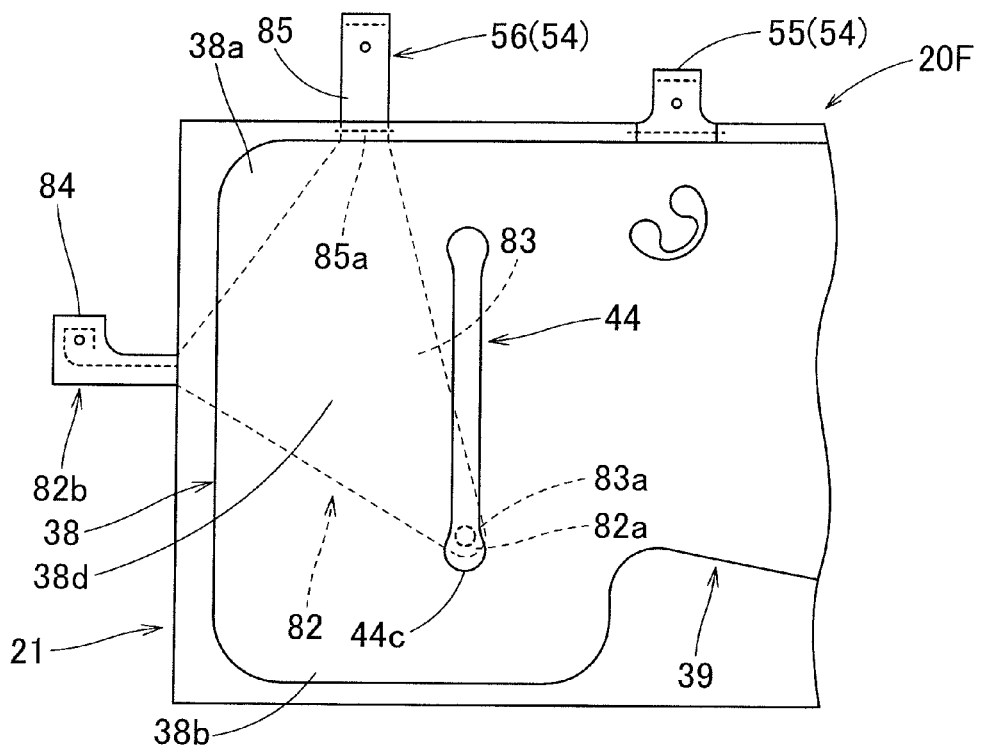
FIG. 19 is a partial enlarged front view of an airbag of yet another alternative embodiment of the invention.
Figure 20:
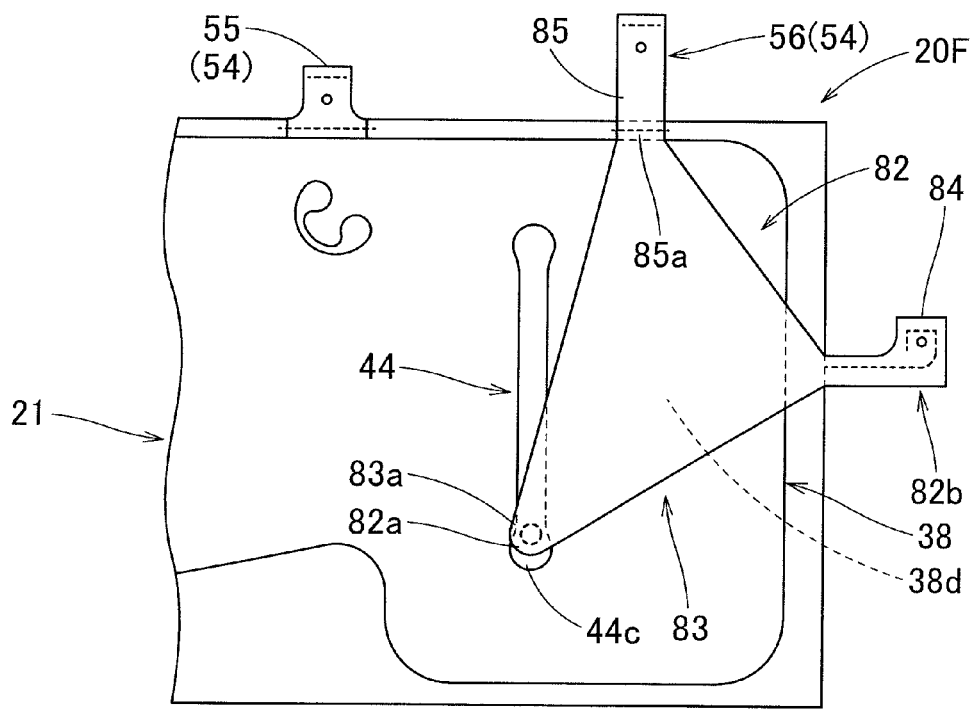
FIG. 20 is a partial enlarged rear view of the airbag of FIG. 19.

FIGS. 19 and 20 depict yet another modification, an airbag 20F. The airbag 20F includes a bag body 21 and a tension cloth 82, and the bag body 21 has a same configuration as the bag body 21 of the above-described airbag 20. Therefore, common members will be shown with common reference numerals and detailed descriptions of the common members will be omitted.

The tension cloth 82 is fabricated of a fabric woven of polyamide yarn, polyester yarn or the like, and includes a support region 83, a mounting portion 84 formed at the leading end 82b and a protruding region 85 serving as a terminal mounting tab 56. The tension cloth 82 has a similar configuration to the tension cloth 58 of the above-described airbag 20 except in outer contour of the support region 83. In a similar fashion to the tension cloth 58 of the above-described airbag 20, a root region 85a of the protruding region 85 is sewn to an upper edge of the terminal inflatable portion 38 of the bag body 21. The support region 83 is so arranged as to cover an outboard side of the terminal inflatable portion 38 and formed into a generally inverted triangle. The lower end 83a of the support region 83 or the root region 82a of the tension cloth 82 extending rearward and downward is coupled to a vicinity of the lower end 44c of the terminal partitioning portion 44. That is, the support region 83 of the tension cloth 82 protrudes further downward than the mounting portion 84 so as to support an outboard side of a region 38d in a vicinity of the center in an up and down direction of the terminal inflatable portion 38 which is inflatable in a thickest fashion. With this configuration, the tension cloth 82 will push an extensive area in an up and down direction of the terminal inflatable portion 38 toward a vehicle interior I at airbag deployment. Moreover, the support region 83 of the tension cloth 82 covers the outboard side of the region 38d in a vicinity of the center in an up and down direction of the terminal inflatable portion 38 inflated in a thickest fashion at airbag deployment, and thus supports the outboard side of the terminal inflatable portion 38 in a steady fashion, such that the terminal inflatable portion 38 will protect a head of an occupant in an adequate fashion in the event of an oblique crash or a rollover.

Although each of the airbags in the foregoing embodiments has the terminal inflatable portion at the front end of the bag body, the location of the terminal inflatable portion should not be limited thereby. The terminal inflatable portion may be located at the rear end of the bag body.

In the head-protecting airbag device of the present invention, a protruding amount of the terminal inflatable portion of the airbag toward a vehicle interior at airbag deployment (i.e., an inclination angle of the terminal inflatable portion relative to a front and rear direction as viewed from an up and down direction) can be adjusted by varying an upward protruding amount of the terminal mounting tab out of the bag body (i.e., the length of the terminal mounting tab in an up and down direction) and a length of the tension cloth in a front and rear direction. More specifically, the inclination angle of the terminal inflatable portion relative to a front and rear direction (the protruding amount of a front end region of the airbag) at airbag deployment is determined by the upward protruding amount (length in an up and down direction) of the terminal mounting tab. If the upward protruding amount of the terminal mounting tab is small, so are the inclination angle of the terminal inflatable portion relative to a front and rear direction and the protruding amount of the terminal inflatable portion toward a vehicle interior. In addition, if the length of the tension cloth in a front and rear direction is great, an amount that the tension cloth pushes the terminal inflatable portion towards a vehicle interior is small. That is, in the foregoing embodiments, the protruding amount of the terminal inflatable portion of the airbag toward a vehicle interior at airbag deployment can be adjusted without changing the outer contour of the bag body, but by varying the upward protruding amount of the terminal mounting tab and the length in a front and rear direction of the tension cloth.

With the configurations of the foregoing embodiments, a head-protecting airbag device mountable at a side of a front passenger seat and a head-protecting airbag device mountable at a side of a driver's seat can be formed with the same bag bodies but with varied contours and/or length of the terminal mounting tabs and tension cloths. Usually, an airbag of an airbag device for a front passenger seat mountable in front of a front passenger seat is designed to protrude further towards a window (towards an outboard direction) at airbag deployment than an airbag for an airbag device for a steering wheel mountable in front of a driver's seat. Therefore, the protruding amount of the terminal inflatable portion of the airbag mountable at a side of the front passenger seat toward a vehicle interior can be set smaller than that of the airbag mountable at a side of the driver's seat. The protruding amount of the terminal inflatable portion towards a vehicle interior may also be determined depending on outer contours of an airbag for a front passenger seat and an airbag for a steering wheel at airbag deployment which are inflatable in proximity.

What is claimed is:

1. A head-protecting airbag device having an airbag that is mountable on an upper periphery of a window of a vehicle on an inboard side of the vehicle in a folded-up configuration with an upper edge of the airbag secured to a vehicle body structure, the airbag being deployable downward over the window when fed with an inflation gas from an inflator, the airbag comprising:

an inflatable bag body that is formed into a flexible bag for covering an inboard side of the window, the bag body including: a terminal inflatable portion located at a terminal region in a front and rear direction of the bag body and so deployable that an upper end region of the terminal inflatable portion be deployed on an inboard side of a pillar of the vehicle disposed at an edge in a front and rear direction of the window in a slanted fashion relative to an up and down direction; and a terminal partitioning portion that partitions the terminal inflatable portion from a remaining general inflatable portion of the bag body;
a tension cloth that is formed of a flexible sheet member and is so disposed as to cover an outboard side of the terminal inflatable portion, a first end of the tension cloth being connected to the terminal partitioning portion and a second end of the tension cloth being adapted to be secured to the vehicle body structure in a periphery of the window distant from the terminal region of the bag body; and
a plurality of mounting tabs that are disposed at a plurality of positions along a front and rear direction of an upper edge of the bag body in such a manner as to protrude upward out of the upper edge of the bag body for mounting the upper edge of the bag body on the vehicle body structure, the mounting tabs including a terminal mounting tab located at the terminal region in a front and rear direction of the bag body where the terminal inflatable portion is located and a general mounting tab located at an upper edge of the general inflatable portion,
wherein the terminal mounting tab is connected to the upper edge of the bag body, and an upper end of the terminal mounting tab is adapted to be mounted on the vehicle body structure, and
wherein an upward protruding amount of the terminal mounting tab extending from the upper edge of the bag body as unfolded in a flat fashion is greater than a corresponding upward protruding amount of the general mounting tab.

2. The head-protecting airbag device of claim 1, wherein the terminal mounting tab is located at a position further toward the terminal region in a front and rear direction of the bag body than an edge of the terminal partitioning portion facing towards the general inflatable portion.

3. A head-protecting airbag device having an airbag that is mountable on an upper periphery of a window of a vehicle on an inboard side of the vehicle in a folded-up configuration with an upper edge of the airbag secured to a vehicle body structure, the airbag being deployable downward over the window when fed with an inflation gas from an inflator, the airbag comprising:
an inflatable bag body that is formed into a flexible bag for covering an inboard side of the window, the bag body including: a terminal inflatable portion located at a terminal region in a front and rear direction of the bag body and so deployable that an upper end region of the terminal inflatable portion be deployed on an inboard side of a pillar of the vehicle disposed at an edge in a front and rear direction of the window in a slanted fashion relative to an up and down direction; and a terminal partitioning portion that partitions the terminal inflatable portion from a remaining general inflatable portion of the bag body;
a tension cloth that is formed of a flexible sheet member and is so disposed as to cover an outboard side of the terminal inflatable portion, a first end of the tension cloth being connected to the terminal partitioning portion and a second end of the tension cloth being adapted to be secured to the vehicle body structure in a periphery of the window distant from the terminal region of the bag body; and
a plurality of mounting tabs that are disposed at a plurality of positions along a front and rear direction of an upper edge of the bag body in such a manner as to protrude upward out of the upper edge of the bag body for mounting the upper edge of the bag body on the vehicle body structure, the mounting tabs including a terminal mounting tab located at the terminal region in a front and rear direction of the bag body where the terminal inflatable portion is located and a general mounting tab located at an upper edge of the general inflatable portion,
wherein the terminal mounting tab is adapted to be mounted on the vehicle body structure by an upper end thereof and an upward protruding amount of the terminal mounting tab out of the bag body as unfolded in a flat fashion is greater than that of the general mounting tab, and
wherein the terminal mounting tab is formed in such a manner as to extend from the tension cloth and a root region of the terminal mounting tab is connected to an upper edge of the terminal inflatable portion in the bag body.

4. The head-protecting airbag device of claim 3, wherein the terminal mounting tab is located at a position further toward the terminal region in a front and rear direction of the bag body than the terminal partitioning portion.

5. The head-protecting airbag device of claim 3, wherein the terminal mounting tab is located generally immediately above a joint that connects the tension cloth to the terminal partitioning portion and further toward the terminal region in a front and rear direction of the bag body than an edge of the terminal partitioning portion facing towards the general inflatable portion.

6. The head-protecting airbag device of claim 2, wherein the terminal mounting tab is provided separate from the tension cloth and located further toward the terminal region in a front and rear direction of the bag body than the terminal partitioning portion.

7. The head-protecting airbag device of claim 2, wherein:
the terminal mounting tab is provided separate from the tension cloth; and
the terminal mounting tab is located generally immediately above a joint that connects the tension cloth to the terminal partitioning portion and further toward the terminal region in a front and rear direction of the bag body than an edge of the terminal partitioning portion facing towards the general inflatable portion.

8. A head-protecting airbag device having an airbag that is mountable on an upper periphery of a window of a vehicle on an inboard side of the vehicle in a folded-up configuration with an upper edge of the airbag secured to a vehicle body structure, the airbag being deployable downward over the window when fed with an inflation gas from an inflator, the airbag comprising:
an inflatable bag body that is formed into a flexible bag for covering an inboard side of the window, the bag body including: a terminal inflatable portion located at a terminal region in a front and rear direction of the bag body and so deployable that an upper end region of the terminal inflatable portion be deployed on an inboard side of a pillar of the vehicle disposed at an edge in a front and rear direction of the window in a slanted fashion relative to an up and down direction; and a terminal partitioning portion that partitions the terminal inflatable portion from a remaining general inflatable portion of the bag body;
a tension cloth that is formed of a flexible sheet member and is so disposed as to cover an outboard side of the terminal inflatable portion, a first end of the tension cloth being connected to the terminal partitioning portion and a second end of the tension cloth being adapted to be secured to the vehicle body structure in a periphery of the window distant from the terminal region of the bag body; and a plurality of mounting tabs that are disposed at a plurality of positions along a front and rear direction of an upper edge of the bag body in such a manner as to protrude upward out of the upper edge of the bag body for mounting the upper edge of the bag body on the vehicle body structure, the mounting tabs including a terminal mounting tab located at the terminal region in a front and rear direction of the bag body where the terminal inflatable portion is located and a general mounting tab located at an upper edge of the general inflatable portion, wherein the terminal mounting tab is adapted to be mounted on the vehicle body structure by an upper end thereof and an upward protruding amount of the terminal mounting tab out of the bag body as unfolded in a flat fashion is greater than that of the general mounting tab, and wherein the tension cloth is run through a slit that is formed at an edge in a front and rear direction of the bag body adjoining the terminal inflatable portion.

9. The head-protecting airbag device of claim 1, wherein the terminal mounting tab is located further towards a center in a front and rear direction of the bag body than the terminal partitioning portion.

10. The head-protecting airbag device of claim 9, wherein the terminal mounting tab is adapted to be mounted on an area of a roof side rail of the vehicle which is continuous with the pillar and extends along the upper periphery of the window.

* * * * *